(12) United States Patent
Yoshida

(10) Patent No.: US 7,975,276 B2
(45) Date of Patent: Jul. 5, 2011

(54) CONTENT PROVIDING SYSTEM AND METHOD, CONTENT PROVIDING APPARATUS AND METHOD, CONTENT RECEIVER AND METHOD, RECORDING MEDIUM, AND PROGRAM

(75) Inventor: Naoki Yoshida, Kanagawa (JP)

(73) Assignee: Sony Corporation (JP)

( * ) Notice: Subject to any disclaimer, the term of this patent is extended or adjusted under 35 U.S.C. 154(b) by 410 days.

(21) Appl. No.: 10/561,617

(22) PCT Filed: May 28, 2004

(86) PCT No.: PCT/JP2004/007776
§ 371 (c)(1),
(2), (4) Date: Sep. 27, 2006

(87) PCT Pub. No.: WO2005/002098
PCT Pub. Date: Jan. 6, 2005

(65) Prior Publication Data
US 2007/0044131 A1 Feb. 22, 2007

(30) Foreign Application Priority Data
Jun. 26, 2003 (JP) .............................. P2003-183136

(51) Int. Cl.
*H04N 7/173* (2011.01)
*H04N 7/16* (2011.01)
*H04N 5/445* (2011.01)
*G09B 3/00* (2006.01)

(52) U.S. Cl. ............ 725/24; 725/60; 725/136; 725/148; 434/350

(58) Field of Classification Search .............. 725/22–24, 725/32, 34–36, 60, 112, 118, 136, 148; 434/350
See application file for complete search history.

(56) References Cited

U.S. PATENT DOCUMENTS

| 5,453,015 | A | * | 9/1995 | Vogel | 434/350 |
| 5,539,822 | A | | 7/1996 | Lett | |
| 5,759,101 | A | * | 6/1998 | Von Kohorn | 463/40 |
| 5,946,026 | A | * | 8/1999 | Suzuki | 725/24 |
| 5,970,467 | A | * | 10/1999 | Alavi | 705/10 |

(Continued)

FOREIGN PATENT DOCUMENTS

EP 1 032 148 A2 8/2000

(Continued)

OTHER PUBLICATIONS

Supplementary European Search Report EP 04745582, dated Mar. 10, 2011.

*Primary Examiner* — Kieu Oanh Bui
*Assistant Examiner* — Pinkal R Chokshi
(74) *Attorney, Agent, or Firm* — Lerner, David, Littenberg, Krumholz & Mentlik, LLP

(57) ABSTRACT

The invention relates to a content providing system and method, a content providing apparatus and method, a content receiver and method, a recording medium, and a program that make it possible to provide viewers with transaction contents at low cost. Plural broadcasting apparatuses include trigger contents in program contents and broadcast the program contents to digital television receivers. The broadcasting apparatus broadcasts transaction contents that are displayed when the trigger contents of the plural broadcasting apparatus are turned on by the plural digital television receivers. It is possible to apply the invention to a digital television broadcasting system.

36 Claims, 30 Drawing Sheets

U.S. PATENT DOCUMENTS

| | | | |
|---|---|---|---|
| 6,766,524 B1 * | 7/2004 | Matheny et al. | 725/23 |
| 7,243,364 B2 * | 7/2007 | Dunn et al. | 725/93 |
| 7,249,367 B2 * | 7/2007 | Bove et al. | 725/60 |
| 7,313,802 B1 * | 12/2007 | Tomsen | 725/23 |
| 7,444,665 B2 * | 10/2008 | Cezeaux et al. | 725/112 |
| 2002/0059602 A1 | 5/2002 | Macrae et al. | |
| 2003/0018966 A1 * | 1/2003 | Cook et al. | 725/2 |
| 2003/0023981 A1 * | 1/2003 | Lemmons | 725/109 |
| 2003/0056219 A1 * | 3/2003 | Reichardt et al. | 725/60 |
| 2003/0093806 A1 * | 5/2003 | Dureau et al. | 725/107 |
| 2003/0115606 A1 * | 6/2003 | Menez | 725/60 |
| 2004/0034873 A1 * | 2/2004 | Zenoni | 725/135 |
| 2005/0144641 A1 * | 6/2005 | Lewis | 725/60 |
| 2010/0057813 A1 * | 3/2010 | Abe et al. | 707/781 |
| 2010/0175080 A1 * | 7/2010 | Yuen et al. | 725/32 |

FOREIGN PATENT DOCUMENTS

| | | |
|---|---|---|
| JP | 09-083969 A | 3/1997 |
| JP | 09-162821 A | 6/1997 |
| JP | 09162821 A * | 6/1997 |
| JP | 2000-244427 A | 9/2000 |
| JP | 2001-008060 A | 1/2001 |
| JP | 2001-325519 A | 11/2001 |
| JP | 2002-511202 A | 4/2002 |
| JP | 2002-164862 A | 6/2002 |
| WO | WO-98/28869 | 7/1998 |
| WO | WO 9828869 A2 * | 7/1998 |

\* cited by examiner

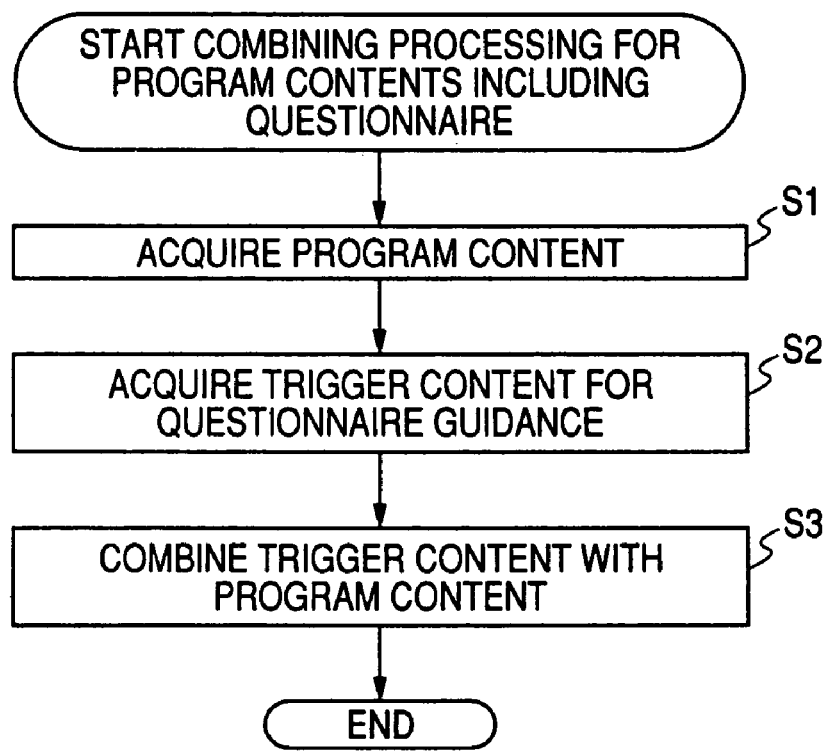
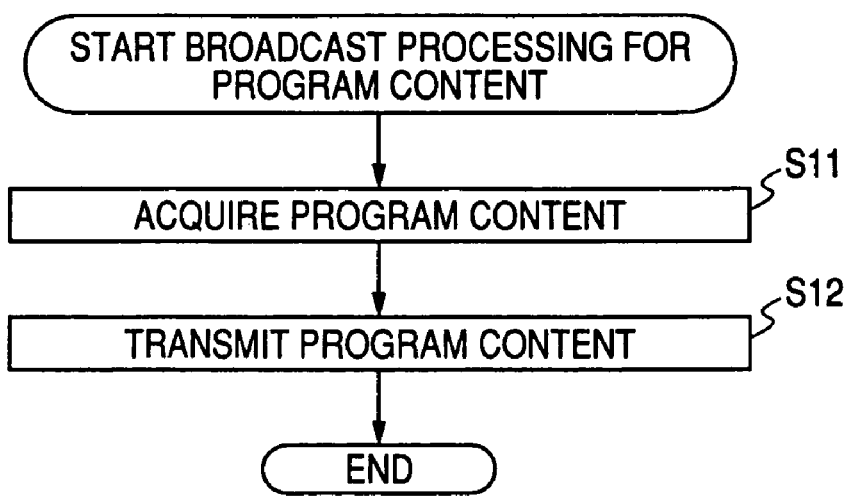

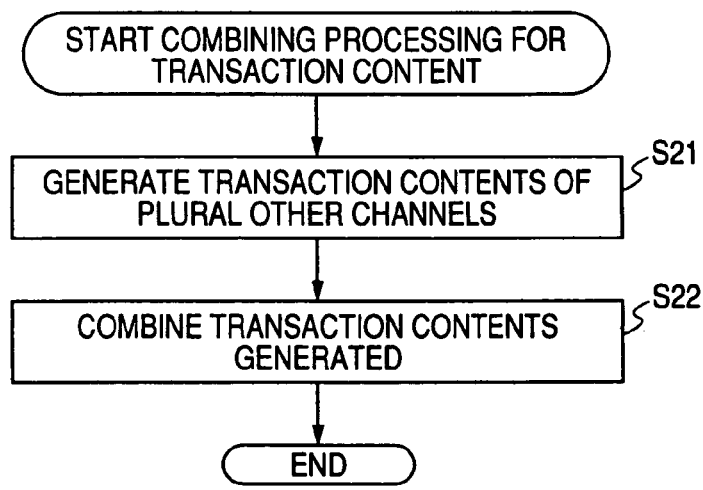

| MODULE ID | CONTENT |
|---|---|
| Module_Id=0x0000 | 【TEMPLATE】 TRANSACTION MAIN CONTENT |
| Module_Id=0x0001 | 【TEMPLATE】 TRANSACTION CONTENT 1 (FOR REQUESTING MATERIAL) |
| Module_Id=0x0002 | 【TEMPLATE】 TRANSACTION CONTENT 2 (FOR QUESTIONNAIRE) |
| Module_Id=0x0003 | 【TEMPLATE】 TRANSACTION CONTENT 3 (FOR SALES) |
| Module_Id=0x0004 | 【TEMPLATE】 TRANSACTION CONTENT 4 (FOR SECRET BALLOT) |
| Module_Id=0x000e | 【TEMPLATE】 COMMON MATERIAL FOR TRANSACTION CONTENT |
| Module_Id=0x000f | 【REPLACEMENT MATERIAL】 VARIABLE MATERIAL SUCH AS QUESTIONNAIRE CONTENT |
| Module_Id=0x0010 | 【TEMPLATE】 COMMON PART |

FIG. 11

| DataES | Module_Id | EXPLANATION |
|---|---|---|
| DataES = 0x40 | Module_Id=0x0000 | 【TEMPLATE】 STARTUP LOGO DISPLAY CONTENT |
| | Module_Id=0x0001 | 【TEMPLATE】 MAIN CONTENT |
| | Module_Id=0x0002 | 【REPLACEMENT MATERIAL】 CM ASSOCIATED TEXT |
| | Module_Id=0x0003 | 【REPLACEMENT MATERIAL】 BANNER |
| | Module_Id=0x0004 | 【REPLACEMENT MATERIAL】 UNASSOCIATED TEXT FORTUNETELLING |
| | Module_Id=0x0005 | 【REPLACEMENT MATERIAL】 MARK RANKING |
| | Module_Id=0x0007 | 【REPLACEMENT MATERIAL】 SHOP LIST |
| | Module_Id=0x0008 | 【REPLACEMENT MATERIAL】 PRESENT |
| | Module_Id=0x0009 | 【REPLACEMENT MATERIAL】 VIEWED GAUGE |
| | Module_Id=0x0010 | 【REPLACEMENT MATERIAL】 CH LINK |
| | Module_Id=0x001f | 【REPLACEMENT MATERIAL】 MAIN CONTENT BACKGROUND IMAGE |
| | Module_Id=0x0100 | 【TEMPLATE】 SUB-CONTENT |
| | Module_Id=0x0200 | 【TEMPLATE】 A CONTENT |
| | Module_Id=0x0201 | 【REPLACEMENT MATERIAL】 A CONTENT |
| | Module_Id=0x1002 | 【REPLACEMENT MATERIAL】 MUSIC ASSOCIATED TEXT/ORDER EFFECTIVE PERIOD |
| | Module_Id=0x1003 | 【REPLACEMENT MATERIAL】 UNASSOCIATED TEXT PROMPT REPORT |
| | Module_Id=0x1004 | 【REPLACEMENT MATERIAL】 NEWS |
| | Module_Id=0x1005 | 【REPLACEMENT MATERIAL】 ASSOCIATED TICKET INFORMATION |
| | Module_Id=0x1101 | 【REPLACEMENT MATERIAL】 STOCK |
| DataES = 0x50 | Module_Id=0x0000 | 【TEMPLATE】 B CONTENT 1 |
| | Module_Id=0x0001 | 【REPLACEMENT MATERIAL】 |
| | Module_Id=0x001f | 【REPLACEMENT MATERIAL】 |
| | Module_Id=0x1001 | 【REPLACEMENT MATERIAL】 |
| DataES = 0x51 | Module_Id=0x0000 | 【TEMPLATE】 B CONTENT 2 |
| | Module_Id=0x0001 | 【REPLACEMENT MATERIAL】 |
| | Module_Id=0x001f | 【REPLACEMENT MATERIAL】 |
| DataES = 0x51 | Module_Id=0x0000 | 【TEMPLATE】 B CONTENT 3 |
| | Module_Id=0x0001 | 【REPLACEMENT MATERIAL】 |
| | Module_Id=0x001f | 【REPLACEMENT MATERIAL】 |
| DataES = 0x6d | Module_Id=0x0000 | 【TEMPLATE】 TEST ES CONTENT |
| DataES = 0x6f | Module_Id=0x0000 | 【TEMPLATE】 TRANSACTION MAIN CONTENT |
| | Module_Id=0x0001 | 【TEMPLATE】 TRANSACTION CONTENT 1 (FOR REQUESTING MATERIAL) |
| | Module_Id=0x0002 | 【TEMPLATE】 TRANSACTION CONTENT 2 (FOR QUESTIONNAIRE) |
| | Module_Id=0x0003 | 【TEMPLATE】 TRANSACTION CONTENT 3 (FOR SALES) |
| | Module_Id=0x0004 | 【TEMPLATE】 TRANSACTION CONTENT 4 (FOR SECRET BALLOT) |
| | Module_Id=0x000e | 【TEMPLATE】 COMMON MATERIAL FOR TRANSACTION CONTENT |
| | Module_Id=0x000f | 【REPLACEMENT MATERIAL】 VARIABLE MATERIAL SUCH AS QUESTIONNAIRE CONTENT |
| | Module_Id=0x0010 | 【TEMPLATE】 COMMON PART |

FIG. 26

INPUT E-MAIL ADDRESS

CUSTOMER INFORMATION

PLEASE INPUT E-MAIL ADDRESS yn@ynos.oc.jp

| KEYBOARD TYPE | → | DELETE PREVIOUS INPUT | CLEAR |
| --- | --- | --- | --- |
| CELLULAR PHONE TYPE | | | |

| CAPITAL LETTER | a | b | c | d | e | f | g | 1 | 2 | 3 |
| --- | --- | --- | --- | --- | --- | --- | --- | --- | --- | --- |
| ● SMALL LETTER | h | i | j | k | l | m | n | 4 | 5 | 6 |
| SIGN | o | p | q | r | s | t | u | 7 | 8 | 9 |
| | v | w | x | y | z | | | | 0 | |
| | . | @ | - | _ | .co | .ne | .or | .ac | .jp | .com |

CANCEL PURCHASE PROCEDURE

RETURN    NEXT

A 66 CH

ADDRESS REGISTERED IN AAA BIDIRECTIONAL MEMBERSHIP IS DISPLAYED.
YOU CAN INPUT OTHER ADDRESSES.

FIG. 30

MODULE ID

SALES IDENTIFICATION NUMBER

INFORMATION ON PURCHASED ITEM
(NAME, NUMBER, NUMBER OF ITEMS)

TOTAL AMOUNT OF COMMODITIES

TOTAL AMOUNT INCLUDING CARRIAGE

INFORMATION ON DISTRIBUTOR
(ADDRESS, TELEPHONE NUMBER,
E-MAIL ADDRESS)

USER IDENTIFICATION NUMBER

DELIVERY DESTINATION

USER INFORMATION
(ADDRESS, TELEPHONE NUMBER,
E-MAIL ADDRESS, CREDIT CARD NUMBER)

CONTENT PROVIDING SYSTEM AND METHOD, CONTENT PROVIDING APPARATUS AND METHOD, CONTENT RECEIVER AND METHOD, RECORDING MEDIUM, AND PROGRAM

CROSS-REFERENCE TO RELATED APPLICATIONS

The present application is a national stage application under 35 U.S.C. §371 of International Application No. PCT/JP2004/007776, filed May 28, 2004, which claims priority from Japanese Application No. P2003-183136, filed Jun. 26, 2003, the disclosures of which are hereby incorporated by reference herein.

BACKGROUND OF THE INVENTION

1. Technical Field

The present invention relates, in particular, to a content providing system and method, a content providing apparatus and method, a content receiver and method, a recording medium, and a program that make it possible to provide viewers with contents at low cost.

2. Background Art

In a BS (Broadcast Satellite) television broadcast and a CS (Communication Satellite) television broadcast, television signals are digitized and broadcasted. This makes it possible not only to secure a larger number of broadcast channels but also to increase a transmission amount of data on the respective broadcast channels compared with that in an analog system.

Thus, for example, it is also proposed to send an advertisement to viewers with a television broadcast via a satellite and receive responses to the advertisement via a network (e.g., JP-A-2001-325519).

However, the proposal in JP-A-2001-325519 does not sufficiently make use of functions of a digital broadcast.

Thus, it is also proposed that each broadcasting station not only broadcasts one program content on one broadcast channel but also broadcasts transaction contents for selling commodities introduced in the program to viewers as a type of a data broadcast.

However, to prepare the transaction contents independently, each broadcasting station has to produce the transaction contents using a BML (Broadcast Markup Language). This takes a lot of time and labor and increases cost. Thus, under the actual circumstances, a data broadcast of each broadcast channel is not sufficiently utilized.

SUMMARY OF THE INVENTION

The invention allows each broadcasting station to provide viewers with transaction contents at low cost to thereby make use of a data broadcast.

A content providing system of the invention is characterized by including: providing a first content from a first content providing apparatus on a first broadcast channel in a state in which a trigger content serving as a trigger for provision of a second content is combined with the first content; providing the second content from a second content providing apparatus on a second broadcast channel; when the trigger content is triggered in a state in which a receiver is receiving the first content on the first broadcast channel, causing the receiver to switch a broadcast channel to be received from the first broadcast channel to the second broadcast channel and receive the second content provided by the second content providing apparatus; and, when end of viewing of the second content is inputted in the receiver, causing the receiver to switch a broadcast channel to be received from the second broadcast channel to the first broadcast channel and receive the first content provided by the first content providing apparatus again.

The receiver can transmit information inputted by a viewer on the basis of the second content provided to an information processing apparatus via a network.

The second content providing apparatus can provide, as the second content, a content for causing a viewer who is viewing the first content to input a response to a questionnaire or a content for causing the viewer to input information necessary for purchasing a commodity.

It is possible to provide a plurality of the second contents corresponding to the respective first contents of a plurality of the first broadcast channels through the one second broadcast channel. The second content providing apparatus can broadcast common contents generated on the basis of an identical template as the plurality of the second contents.

A first content providing method of the invention is characterized by including: providing a first content from a first content providing apparatus on a first broadcast channel in a state in which a trigger content serving as a trigger for provision of a second content is combined with the first content; providing the second content from a second content providing apparatus on a second broadcast channel; when the trigger content is triggered in a state in which a receiver is receiving the first content on the first broadcast channel, causing the receiver to switch a broadcast channel to be received from the first broadcast channel to the second broadcast channel and receive the second content provided by the second content providing apparatus; and, when end of viewing of the second content is inputted in the receiver, causing the receiver to switch a broadcast channel to be received from the second broadcast channel to the first broadcast channel and receive the first content provided by the first content providing apparatus again.

The receiver can transmit information inputted by a viewer on the basis of the second content provided to an information processing apparatus via a network.

The second content providing apparatus can provide, as the second content, a content for causing a viewer who is viewing the first content to input a response to a questionnaire or a content for causing the viewer to input information necessary for purchasing a commodity.

It is possible to provide a plurality of the second contents corresponding to the respective first contents of a plurality of the first broadcast channels through the one second broadcast channel. The second content providing apparatus can broadcast common contents generated on the basis of an identical template as the plurality of the second contents.

A content providing apparatus of the invention is characterized by including: acquiring means that acquires a plurality of second contents that are second contents, provision of which is triggered by trigger contents provided from other content providing apparatuses on first broadcast channels while being combined with first contents and are common contents, which are generated on the basis of an identical template, corresponding to the respective first contents provided by a plurality of the other content providing apparatuses on the first broadcast channels; and transmitting means that transmits the plurality of the second contents on one second broadcast channel.

The content providing apparatus may further include holding means that receives, via a network, information inputted from a viewer on the basis of the second content transmitted and holds the information.

The acquiring means can acquire, as the second content, a content for causing a viewer viewing the first content to input a response to a questionnaire or a content for causing the viewer to input information necessary for purchasing a commodity.

A second content providing method of the invention is characterized by including: an acquiring step of acquiring a plurality of second contents that are second contents, provision of which is triggered by trigger contents provided from other content providing apparatuses on first broadcast channels while being combined with first contents and are common contents, which are generated on the basis of an identical template, corresponding to the respective first contents provided by a plurality of the other content providing apparatuses on the first broadcast channels; and a transmitting step of transmitting the plurality of the second contents on one second broadcast channel.

The second content providing method may further include a holding step of receiving, via a network, information inputted from a viewer on the basis of the second content transmitted and holding the information.

In the acquiring step, it is possible to acquire, as the second content, a content for causing a viewer viewing the first content to input a response to a questionnaire or a content for causing the viewer to input information necessary for purchasing a commodity.

A program in a first recording medium and a first program of the invention are programs for the content providing apparatus, characterized by including: an acquiring step of acquiring a plurality of second contents that are second contents, provision of which is triggered by trigger contents provided from other content providing apparatuses on first broadcast channels while being combined with first contents and are common contents, which are generated on the basis of an identical template, corresponding to respective first contents provided by a plurality of the other content providing apparatuses on the first broadcast channels; and a transmitting step of transmitting the plurality of the second contents on one second broadcast channel.

The program in a first recording medium and the first program may further include a holding step of receiving, via a network, information inputted from a viewer on the basis of the second content transmitted and holding the information.

In the acquiring step, it is possible to acquire, as the second content, a content for causing a viewer viewing the first content to input a response to a questionnaire or a content for causing the viewer to input information necessary for purchasing a commodity.

A content receiver of the invention is characterized by including: receiving means that receives a first content provided by a first content providing apparatus on a first broadcast channel and receives a second content provided by a second content providing apparatus on a second broadcast channel; judging means that judges whether the second content is triggered on the basis of a trigger content combined with the first content in a state in which the first content is received on the first broadcast channel; and switching control means that performs control to switch, when it is judged by the judging means that the second content is triggered, a channel to be received from the first broadcast channel to the second broadcast channel and switch, when end of viewing of the second content is inputted, a channel to be received from the second broadcast channel to the first broadcast channel.

The content receiver may further include transmitting means that transmits, via a network, information inputted from a viewer on the basis of the second content provided to an information processing apparatus.

The receiving means can receive, as the second content, a content for causing a viewer viewing the first content to input a response to a questionnaire or a content for causing the viewer to input information necessary for purchasing a commodity.

The receiving means can select and receive the second content corresponding to the first broadcast channel being received out of a plurality of the second contents that are common contents, which are generated on the basis of an identical template, transmitted on the one second broadcast channel and corresponding to the respective first contents provided by a plurality of the first content providing apparatuses on the first broadcast channels thereof.

A content receiving method of the invention is characterized by including: a first receiving step of receiving a first content provided by a first content providing apparatus on a first broadcast channel; a judging step of judging whether a second content is indicated on the basis of a trigger content combined with the first content in a state in which the first content is received on the first broadcast channel; a first switching control step of switching, when it is judged by processing of the judging step that the second content is indicated, a channel to be received from the first channel to the second channel; a second receiving step of receiving the second content provided by a second content providing apparatus on a second broadcast channel; and a second switching control step of performing control to switch, when end of viewing of the second content is inputted, a channel to be received from the second broadcast channel to the first broadcast channel.

The content receiving method may further include a transmitting step of transmitting information inputted from a viewer on the basis of the second content provided to an information processing apparatus via a network.

In the second receiving step, it is possible to receive, as the second content, a content for causing a viewer viewing the first content to input a response to a questionnaire or a content for causing the viewer to input information necessary for purchasing a commodity.

In the second receiving step, it is possible to select and receive the second content corresponding to the first broadcast channel being received out of a plurality of the second contents that are common contents, which are generated on the basis of an identical template, transmitted on the one second broadcast channel and corresponding to the respective first contents provided by a plurality of the first content providing apparatuses on the first broadcast channels thereof.

A program in a second recording medium and a second program are characterized by including: a first receiving step of receiving a first content provided by a first content providing apparatus on a first broadcast channel; a judging step of judging whether a second content is indicated on the basis of a trigger content combined with the first content in a state in which the first content is received on the first broadcast channel; a first switching control step of switching, when it is judged by processing of the judging step that the second content is indicated, a channel to be received from the first channel to the second channel; a second receiving step of receiving the second content provided by a second content providing apparatus on a second broadcast channel; and a second switching control step of performing control to switch, when end of viewing of the second content is inputted, a channel to be received from the second broadcast channel to the first broadcast channel.

The program in a second recording medium and the second program may further include a transmitting step of transmitting information inputted from a viewer on the basis of the second content provided to an information processing apparatus via a network.

In the second receiving step, it is possible to receive, as the second content, a content for causing a viewer viewing the first content to input a response to a questionnaire or a content for causing the viewer to input information necessary for purchasing a commodity.

In the second receiving step, it is possible to select and receive the second content corresponding to the first broadcast channel being received out of a plurality of the second contents that are common contents, which are generated on the basis of an identical template, transmitted on the one second broadcast channel and corresponding to the respective first contents provided by a plurality of the first content providing apparatuses on the first broadcast channels thereof.

In a first invention, when a trigger content is triggered in a state in which a first content is received on a first broadcast channel, the receiver switches a channel to be received from the first broadcast channel to a second broadcast channel and receives a second content. When end of viewing of the second content is inputted, a channel to be received is switched from the second broadcast channel to the first broadcast channel again.

In a second invention, a plurality of the second contents that are common contents, which are generated on the basis of an identical template, corresponding to the respective first contents provided by a plurality of the other content providing apparatuses on first broadcast channels thereof are transmitted.

In a third invention, when it is judged that a second content is triggered on the basis of a trigger content in a state in which a first content is received on a first broadcast channel, a channel to be received is switched from the first broadcast channel to a second broadcast channel. When end of viewing of the second content is inputted, a channel to be received is switched from the second broadcast channel to the first broadcast channel.

BRIEF DESCRIPTION OF THE DRAWINGS

FIG. 7 is a flowchart for explaining combining processing for program contents including a questionnaire.

FIG. 8 is a flowchart for explaining broadcast processing for a program content.

FIG. 9 is a flowchart for explaining broadcast processing for a transaction content.

FIG. 10 is a diagram showing an example of a constitution of a module.

FIG. 11 is a diagram showing an example of a constitution of the module.

FIG. 26 is a diagram showing an example of a transaction content for input of an e-mail address.

FIG. 30 is a diagram showing an example of a communication telegram.

DETAILED DESCRIPTION

Best Mode for Carrying Out the Invention

Embodiments of the invention will be explained.

Figure 1:
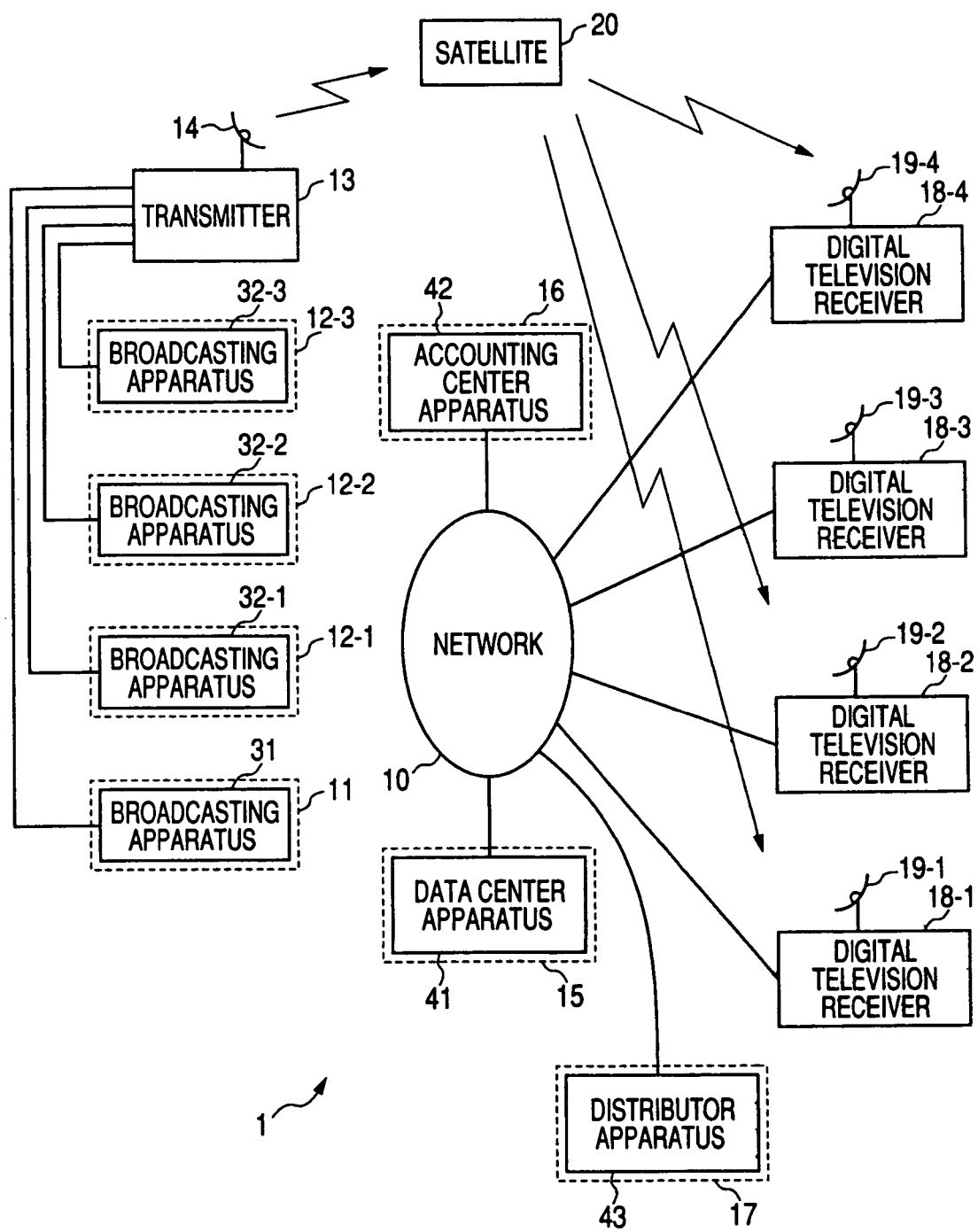
FIG. 1 is a block diagram showing a constitution of a broadcasting system to which the invention is applied.

FIG. 1 shows an example of a constitution of a broadcasting system to which the invention is applied. In this digital broadcasting system 1, a digital television broadcast signal outputted by a broadcasting apparatus 31 held by a broadcasting station 11 is supplied to a transmitter 13. Similarly, digital television broadcast signal outputted by broadcasting apparatuses 32-1, 32-2, and 32-3 held by broadcasting stations 12-1, 12-2, and 12-3 are supplied to the transmitter 13. The transmitter 13 multiplexes the television broadcast signals supplied from the broadcasting apparatus 31 and the broadcasting apparatuses 32-1 to 32-3 and broadcasts the television broadcast signals from an antenna 14 via a satellite 20. The satellite 20 is constituted by a BS (Broadcast Satellite), a CS (Communication Satellite), a 110 CS, or the like of a digital system.

Digital television receivers 18-1, 18-2, 18-3, and 18-4 receive digital television broadcast signals from the satellite 20 via antennas 19-1, 19-2, 19-3, and 19-4, respectively.

The digital television receivers 18-1 to 18-4 are connected to a network 10 constituted by a network such as the Internet. Moreover, other than a data center apparatus 41 in a data center 15 and an accounting center apparatus 42 in an accounting center 16, a distributor apparatus 43 in a distributor 17 is connected to the network 10.

The data center apparatus 41 collects data transmitted by the digital television receivers 18-1 to 18-4. The accounting center apparatus 42 performs accounting processing at the time when viewers of the digital television receivers 18-1 to 18-4 have purchased commodities on the basis of transaction contents provided by the broadcasting apparatuses 32-1 to 32-3. The distributor apparatus 43 performs delivery processing for the commodities.

Note that, although only the four broadcasting apparatuses and the one transmitter are shown in FIG. 1, it goes without saying that a larger number of broadcasting apparatuses and transmitters may be provided. Similarly, although only the four digital television receivers are shown, actually, a larger number of digital television receivers receive television broadcast signals.

The number of the data center apparatuses 41, the number of the accounting center apparatuses 42, and the number of the distributor apparatuses 43 do not have to be one, respectively, but may be plural. The data center apparatus 41, may be integrated with the broadcasting apparatus 31 as required.

In this digital broadcasting system 1, the broadcasting apparatuses 32-1 to 32-3 broadcast program contents and broadcast transaction contents in association with the broadcast program contents. However, actually, the transaction contents are broadcasted from the broadcasting apparatus 31. Actually, the broadcasting apparatuses 32-1 to 32-3 do not broadcast transaction contents per se but broadcast trigger contents that give a trigger for transiting from a program content to a transaction content.

Note that, in the following description, when it is unnecessary to distinguish the broadcasting apparatuses 32-1 to 32-3 individually, the broadcasting apparatuses 32-1 to 32-3 are simply referred to as the broadcasting apparatus 32. Similarly, when it is unnecessary to distinguish the digital television receivers 18-1 to 18-4 individually, the digital television receivers 18-1 to 18-4 are simply referred to as the digital television receiver 18. Similarly, when it is unnecessary to distinguish the antennas 19-1 to 19-4 individually, the antennas 19-1 to 19-4 are simply referred to as the antenna 19.

Figure 2:
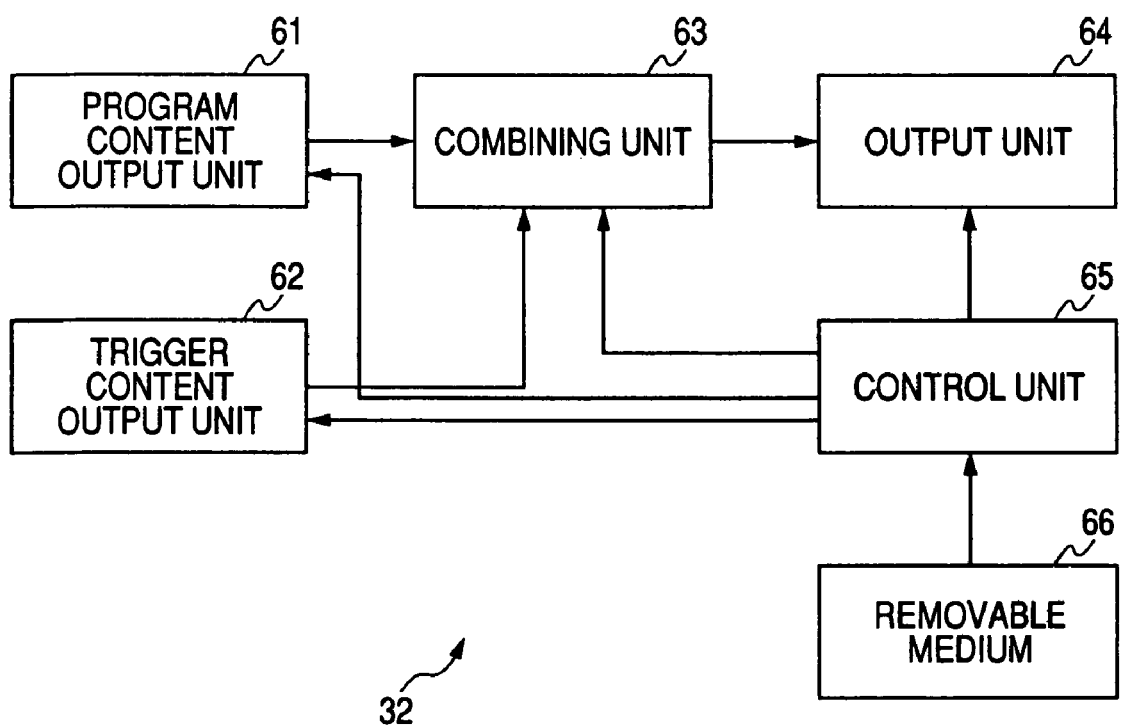
FIG. 2 is a block diagram showing an example of a constitution of a broadcasting apparatus in FIG. 1.

FIG. 2 represents an example of a constitution of the broadcasting apparatus 32. A program content output unit 61 holds program contents recorded in a magnetic tape, a hard disk, an optical disk, and other recording media. A trigger content output unit 62 holds a trigger content. This trigger content is a content for giving a trigger for transiting to a transaction content provided by the broadcasting apparatus 32 in association with a program content (a sub-content incidental to the program content).

A combining unit 63 combines a program content outputted from the program content output unit 61 and a trigger content outputted from the trigger content output unit 62. The trigger content is combined to be a part of the program content (to be displayed on a screen of the program content). The combination per se may be directly performed in the combining unit 63 or may be performed on the digital television receiver 18 side. Note that, when a trigger content is already combined with a program content outputted from the program content output unit 61, the trigger content output unit 62 and the combining unit 63 do not have to be provided.

An output unit 64 outputs content data supplied from the combining unit 63 to the transmitter 13 as a digital television signal.

A control unit 65 controls operations of the program content output unit 61, the trigger content output unit 62, the combining unit 63, and the output unit 64.

A removable medium 66 is inserted in the broadcasting apparatus 32 as required and supplies a necessary computer program or the like to the control unit 65.

Figure 3:
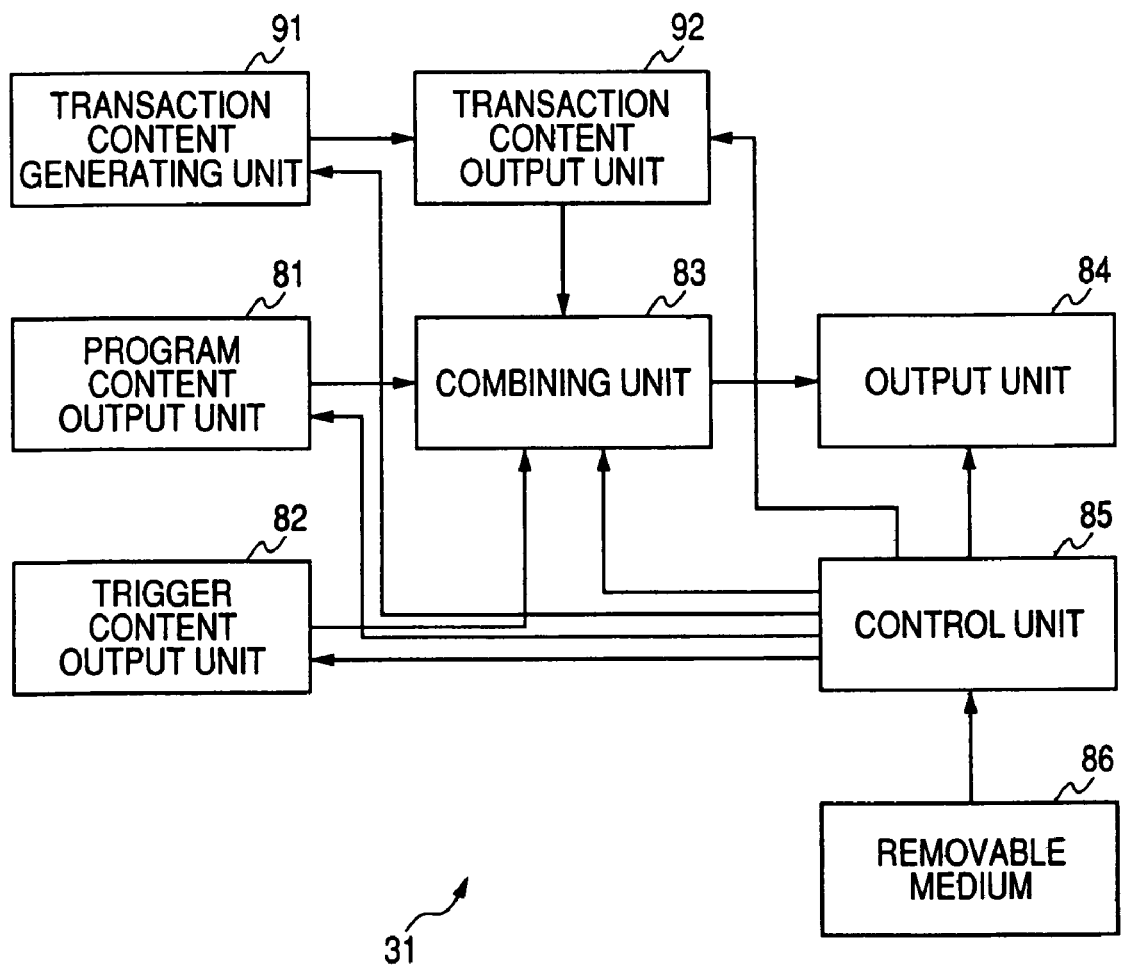
FIG. 3 is a block diagram showing an example of a constitution of the broadcasting apparatus in FIG. 1.

The broadcasting apparatus 31, which broadcasts transaction contents of the plural broadcasting apparatuses 32-1 to 32-3, is constituted as shown in FIG. 3. A program content output unit 81, a trigger content output unit 82, a combining unit 83, an output unit 84, a control unit 85, and a removable medium 86 in this broadcasting apparatus 31 have functions corresponding to the program content output unit 61, the trigger content output unit 62, the combining unit 63, the output unit 64, the control unit 65, and the removable medium 66 of the broadcasting apparatus 32 in FIG. 2. In other words, the broadcasting apparatus 31 is different from the broadcasting apparatus 32 in FIG. 2 in that the broadcasting apparatus 31 has a transaction content generating unit 91 and a transaction content output unit 92. Otherwise, the broadcasting apparatus 31 is the same as the broadcasting apparatus 32 in FIG. 2.

The transaction content generating unit 91 generates a transaction content that the broadcasting apparatus 31 broadcasts for the broadcasting apparatuses 32-1 to 32-3. The transaction content output unit 92 holds the transaction content generated by the transaction content generating unit 91. The combining unit 83 supplies the transaction content supplied from the transaction content output unit 92 to the output unit 84 and causes the output unit 84 to transmit the transaction content to the transmitter 13.

Note that, basically, the broadcasting apparatus 31 has a function of broadcasting a transaction content for the transmitter 32. However, the broadcasting apparatus 31 also has a function of broadcasting a program content of the broadcasting apparatus 31 itself in the same manner as the broadcasting apparatus 32.

Figure 4:
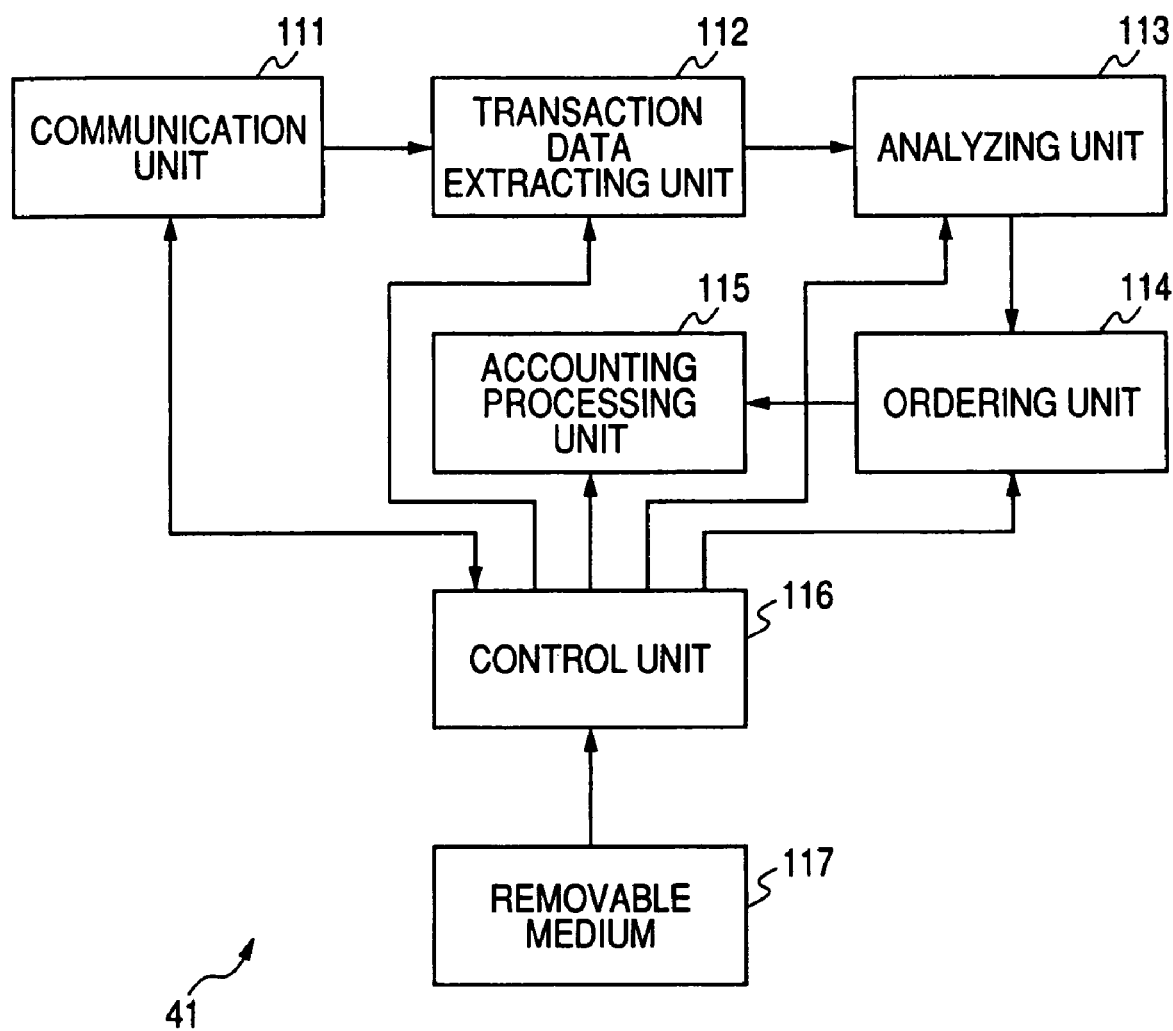
FIG. 4 is a block diagram showing an example of a constitution of a data center apparatus in FIG. 1.

FIG. 4 shows an example of a constitution of the data center apparatus 41. In this example of the constitution, a communication unit 111 communicates with the digital television receiver 18 via the network 10 and receives data transmitted from the digital television receiver 18. In addition, the communication unit 111 transmits a signal indicating normal or abnormal, a reception number, and the like to the digital television receiver 18. A transaction data extracting unit 112 extracts transaction data from the data received by the communication unit 111 and holds the transaction data. An analyzing unit 113 analyzes a content of the transaction data extracted by the transaction data extracting unit 112 and holds the content.

An ordering unit 114 performs, when the content of the transaction data obtained as a result of the analysis by the analyzing unit 113 is purchase of a commodity, processing for ordering the commodity. An accounting processing unit 115 performs, when ordering is performed by the ordering unit 114, accounting processing for the commodity ordered.

The control unit 116 controls operations of the communication unit 111, the transaction data extracting unit 112, the analyzing unit 113, the ordering unit 114, and the accounting processing unit 115. A removable medium 117 loads a computer program in the control unit 116.

Figure 5:
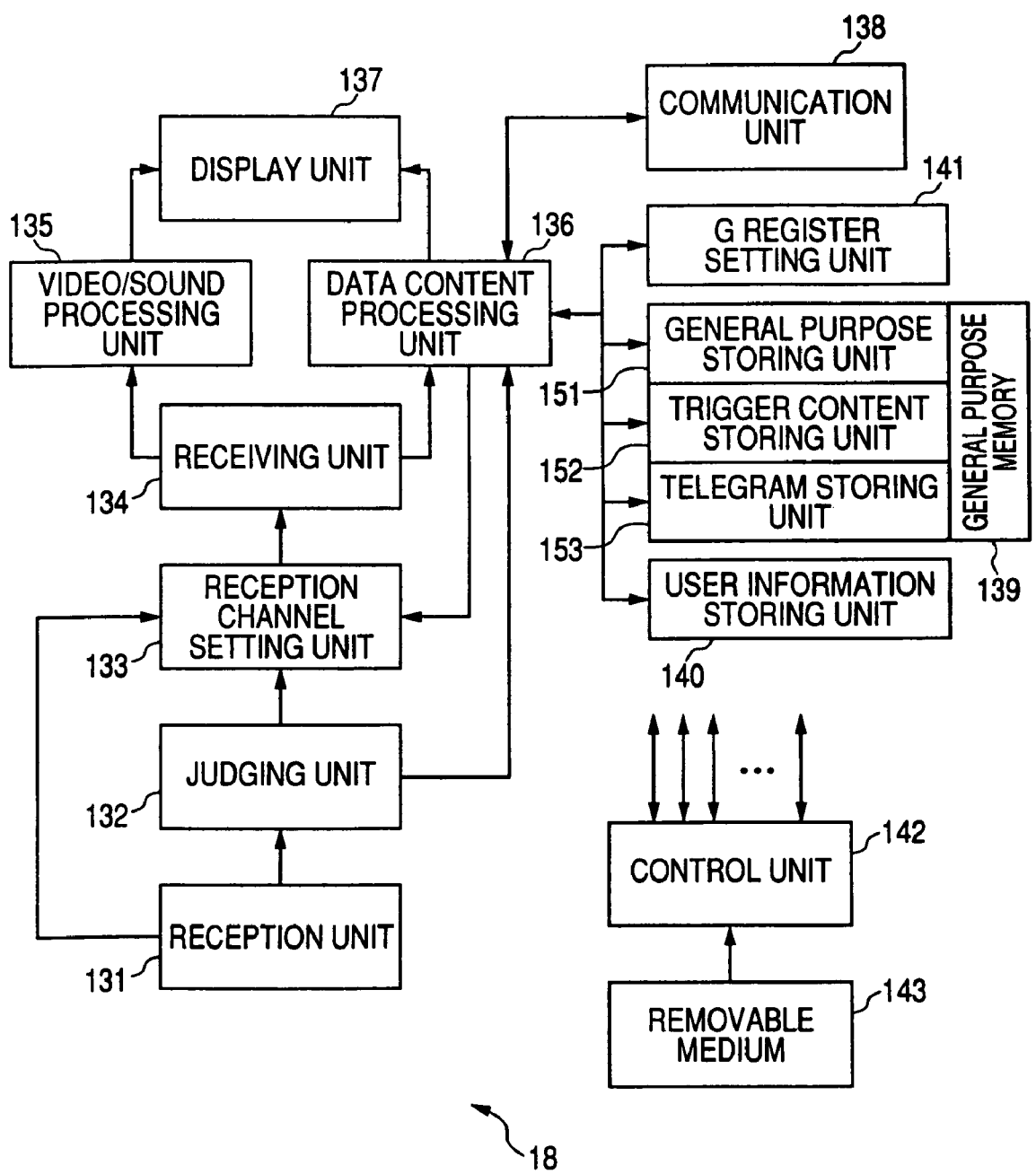
FIG. 5 is a block diagram showing an example of a constitution of a digital television receiver in FIG. 1.

FIG. 5 shows an example of a constitution of the digital television receiver 18. A receiving unit 134 receives digital television signals, which are broadcasted from the broadcasting apparatus 31 and the broadcasting apparatus 32 via the satellite 20, via the antenna 19. The digital television receiver 18 demodulates video/sound parts of the television signals received by the receiving unit 134 with a video/sound processing unit 135 and displays a video on a display unit 137. The digital television receiver 18 extracts data contents (including a trigger content and a transaction content) of the television signals and stores the data contents in a general purpose memory 139 (including a general purpose storing unit 151, a trigger content storing unit 152, and a telegram storing unit 153).

The data content processing unit 136 processes the data contents stored in the general purpose memory 139, outputs the data contents to the display unit 137 as required, and causes the display unit 137 to display the data contents.

When a command from a reception unit 131 is judged as a reception channel change command by a judging unit 132, a reception channel setting unit 133 controls the receiving unit 134 to cause the receiving unit 134 to receive a predetermined broadcast channel. When a reception channel change command is generated by the data content processing unit, the reception channel setting unit 133 controls the receiving unit 134 to cause the receiving unit 134 to receive a predetermined broadcast channel.

The receiving unit 134 receives an operation input from a user. Data received and obtained is supplied to the judging unit 132. The judging unit 132 judges whether a command from the reception unit 131 is a reception channel change command or a command necessary for data content processing. In the former case, the judging unit 132 controls the reception channel setting unit 133 and causes the receiving unit 134 to receive a predetermined broadcast channel. In the latter case, the judging unit 132 supplies the data to the data content processing unit 136.

A G register setting unit 141 sets data necessary for a G register built therein.

A communication unit 138 is controlled by the data content processing unit 136 to communicate with the data center apparatus 41 via the network 10. The communication unit 138 changes information received by the reception unit 131 to a telegram together with a user identification number stored in the user information storing unit 140 and transmits the information. The communication unit 138 receives a telegram (an error code, a reception number, a reception date and time, etc.) transmitted from the data center apparatus 41 and causes a telegram storing unit 153 to set the telegram.

A control unit 142 controls the respective units on the basis of a command from a viewer or commands from the respective units received by the reception unit 131. A removable medium 143 is inserted in the digital television receiver 18 as required and supplies a necessary computer program and other data to the control unit 142 according to circumstances.

Figure 6:
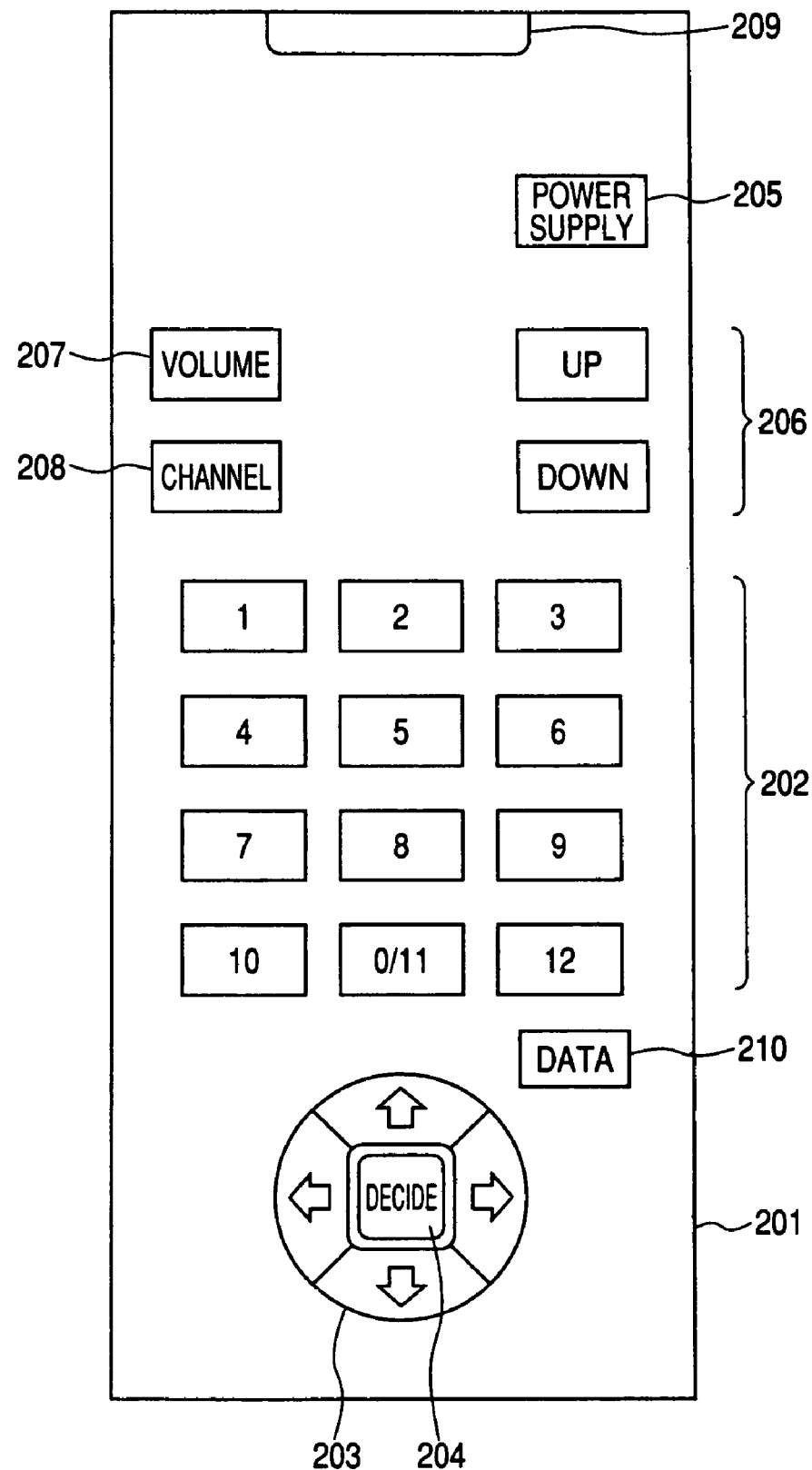
FIG. 6 is a front view showing an example of a constitution of a remote commander that remotely operates the digital television receiver in FIG. 1.

The digital television receiver 18 is operated on the basis of an input from a button, a switch, or the like (not shown) provided in the reception unit 131 or an input from a remote commander 201 shown in FIG. 6. This remote commander 201 has numerical buttons 202 that are operated in inputting numerals 0 to 12. The remote commander 201 has, below the numerical buttons 202, direction buttons 203 that are operated in moving a cursor in up and down directions and left and right directions and a decide button 204 that is arranged in the center of the direction buttons 203 and operated in deciding processing.

A volume button 207 and a channel button 208 are arranged on the left above the numerical buttons 202. Buttons 206 that are operated in turning up and down a volume or a channel are provided on the right above the numerical button 202. A power supply button 205 that is operated in turning on and off the power supply is provided above the button 206. Moreover, a light emitting unit 209 is provided on an upper end surface in the figure of the remote commander 201. The light emitting unit 209 generates an infrared ray signal corresponding to an operated button and outputs the infrared ray signal to the reception unit 131 of the digital television receiver 18.

A data button 210 is a button that is provided as required. The data button 210 is operated in instructing display or non-display of data broadcast on a moving image broadcast.

Combining processing for program contents will be explained with reference to a flowchart in FIG. 7. For convenience of explanation, it is assumed that the broadcasting apparatus 32 performs this processing. However, when program contents already subjected to this processing by another apparatus are provided, the broadcasting apparatus 32 does not have to execute this processing.

In step S1, the program content output unit 61 acquires a program content to be broadcasted and outputs the program content to the combining unit 63. When a transaction content of a questionnaire is broadcasted as a data broadcast in association with the program content, in step S2, the trigger content output unit 62 acquires a trigger content corresponding to the transaction contents of the questionnaire and outputs the trigger content to the combining unit 63. The trigger content includes a program for executing predetermined processing other than a questionnaire number as a number for identifying the transaction content and a designated channel as a broadcast channel for broadcasting the transaction content. Note that the transaction content is broadcasted on the broadcast channel of the broadcasting apparatus 31 rather than the broadcast channel of the broadcasting apparatus 32. Thus, in this case, the broadcast channel of the broadcasting apparatus 31 is designated as the designated channel.

In step S3, the combining unit 63 combines the trigger content acquired in step S2 with the program content acquired in step S1 such that the trigger content becomes a part of the program content. This combining processing may be performed by arranging the trigger content on a screen of the program content. Alternatively, it is also possible that the combining unit 63 generates a display command for combining and displaying the trigger content in a predetermined position of the screen of the program content, transmits the display command to the digital television receiver 18, and causes the digital television receiver 18 to perform actual combination of the program content and the trigger content.

When the processing described above is performed off-line, the acquired program content is stored in the program content output unit 61. When the processing is performed on a real time basis, broadcast processing for the program content is executed immediately.

The broadcast processing is executed as shown in a flowchart in FIG. 8. In step S1, the program content output unit 61 acquires a program content to be broadcasted.

In step S12, the output unit 64 transmits the program content combined with the trigger content, which is supplied via the program content output unit 61, to the transmitter 13 via the combining unit 63. This processing may be performed on a real time basis or may be performed off-line.

The processing described above is executed in the broadcasting apparatuses 32-1 to 32-3 individually.

On the other hand, the broadcasting apparatus 31 performs processing for extracting transaction contents from program contents supplied from the broadcasting apparatuses 32-1 to 32-3 off-line (or on-line) and combining the transaction contents. This processing is shown in a flowchart in FIG. 9.

First, in step S21, the transaction content generating unit 91 generates transaction contents as sub-contents of program contents to be broadcasted by the broadcasting apparatuses 32-1 to 32-3. In step S22, the transaction content generating unit 91 combines the transaction contents generated in step S21.

FIG. 10 is shows an example of combination of transaction contents. As shown in FIG. 10, contents are combined such that the contents can be broadcasted in a carousel system. The carousel system is a system for packetizing, by a unit of a module, data to be broadcasted, connecting plural modules in a ring shape, and sending the modules in order. In the example in FIG. 10, other than a transaction main content with a module ID "0x0000", transaction contents 1 to 4 with modules IDS "0x0001" to "0x0004" are combined. The transaction content 1 is a transaction content for requesting a material, the transaction content 2 is a transaction content for a questionnaire, the transaction content 3 is a transaction content for sales, and the transaction content 4 is a transaction content for secret ballot.

A module with a module ID "0x000e" is set as a module of a common material for transaction contents. A module with a module ID "0x000f" is set as a module of a variable material such as a content of a questionnaire. A module with a module ID "0x0010" is set as a module of a common part common to the transaction contents. The contents with the modules IDs "0x0000" to "0x000e" and "0x0010" are set as templates, respectively. The content with the module ID "0x000f" is set as a replacement material and includes a content to be replaced with other contents according to circumstances.

FIG. 11 shows an example of a constitution of elementary streams combined with transaction contents. In this example, six elementary streams with data elementary stream numbers "0x40", "0x50", "0x51", "0x52", "0x6d", and "0x6f" are shown.

The elementary streams are constituted by the necessary numbers of modules, respectively. Modules IDs are given to the modules, respectively. In the case of this example, the elementary stream of the number "0x6f" among the elementary streams is an elementary stream for transaction contents. Contents of the transaction contents are identical with those shown in FIG. 10.

In this way, transaction contents of plural broadcast channels are included in the transaction contents of "0x6f". Therefore, in the television receiver 18, it is possible to capture and use the transaction contents of all the broadcast channels at arbitrary timing.

Figure 12:
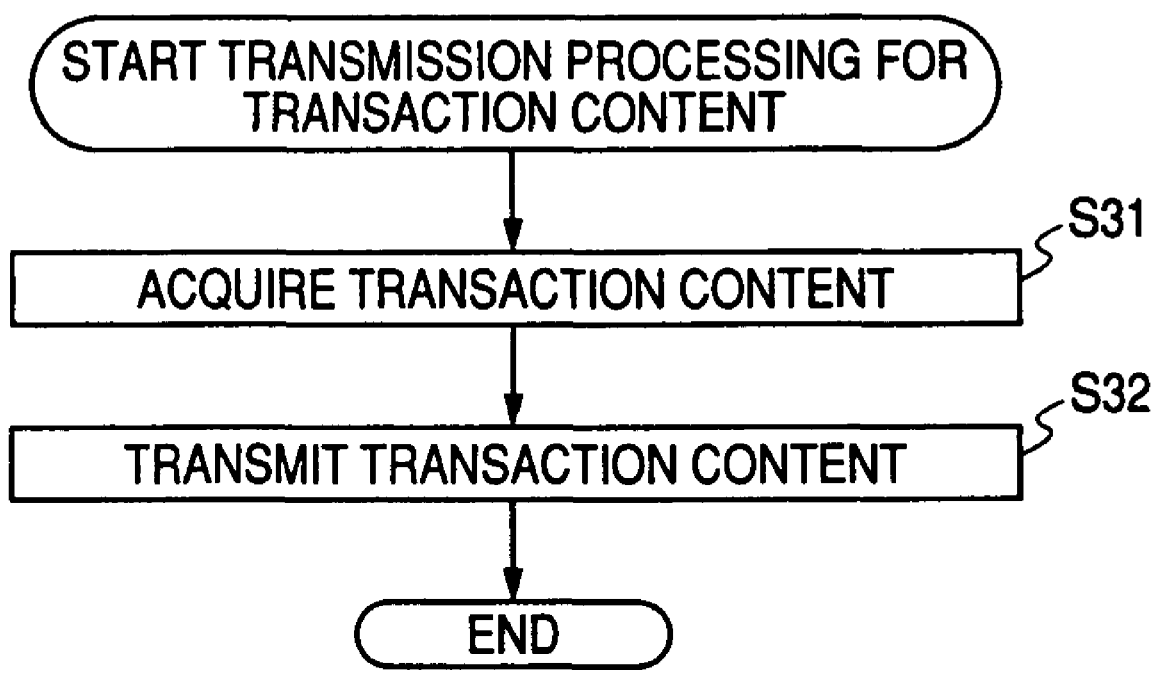
FIG. 12 is a flowchart for explaining transmission processing for a transaction content.

The transaction contents generated as described above are always broadcasted by the broadcasting apparatus 31. FIG. 12 shows an example of processing in this case. In step S31, the transaction content output unit 92 acquires the transaction contents generated by the transaction content generating unit 91. In step S32, the transaction content output unit 92 supplies the transaction contents acquired by the processing in step S31 to the output unit 84 via the combining unit 83. The output unit 84 transmits the supplied transaction contents to the transmitter 13.

The transmitter 13 combines contents including the supplied transaction contents with transaction contents supplied from the broadcasting apparatuses 32 and, then, transmits the contents to the respective digital television receivers 18 on the channel of the transmitter 31 via the satellite 20.

Note that, in the case of this example, the transmitter 31 broadcasts only the transaction contents and does not broadcast program contents.

Figure 13:
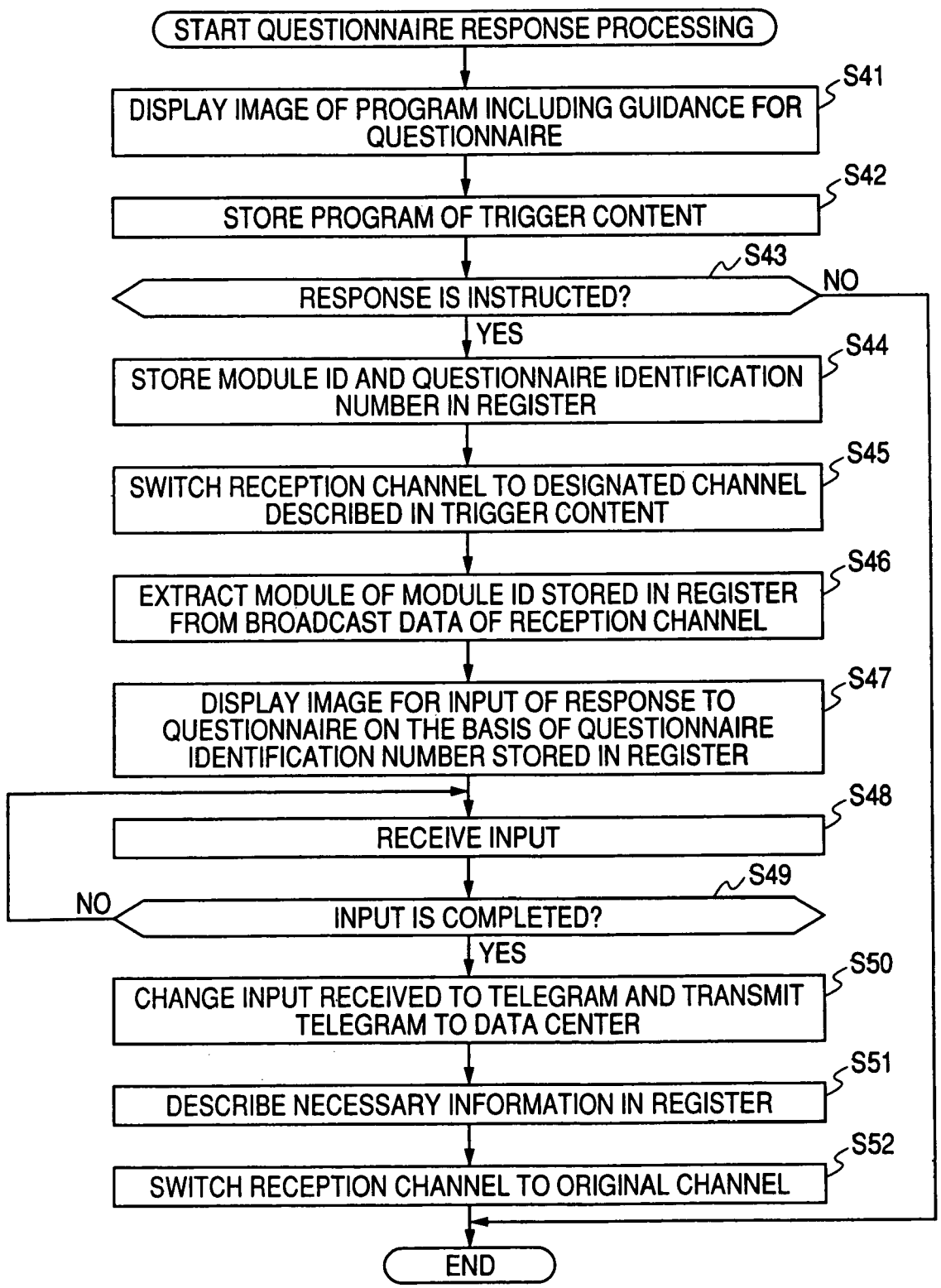
FIG. 13 is a flowchart for explaining response processing for a questionnaire.

Questionnaire response processing of the digital television receiver 18 in the case in which digital television broadcast is performed as described above will be explained with reference to a flowchart in FIG. 13.

When a viewer operates the numeral buttons 202 of the remote commander 201 and designates, for example, a broadcast channel of the transmitter 32-1, the reception unit 131 receives a signal from the remote commander 201. At this point, the reception unit 131 outputs a signal for designating the designated broadcast channel of the transmitter 32-1 to the reception channel setting unit 133. The reception channel setting unit 133 controls the receiving unit 134 on the basis of the control signal from the reception unit 131 and instructs the receiving unit 134 to receive the designated broadcast channel. In step S41, when the receiving unit 134 receives the broadcast channel set by the reception channel setting unit 133, the receiving unit 134 outputs a reception signal of the broadcast channel to the video/sound processing unit 135. The video/sound signal processing unit 135 demodulates a video signal and a voice signal and outputs the video signal and the voice signal to the display unit 137. Consequently, for example, a program content broadcasted by the broadcasting apparatus 32-1 is received, outputted to the display unit 137, and displayed.

Figure 14:
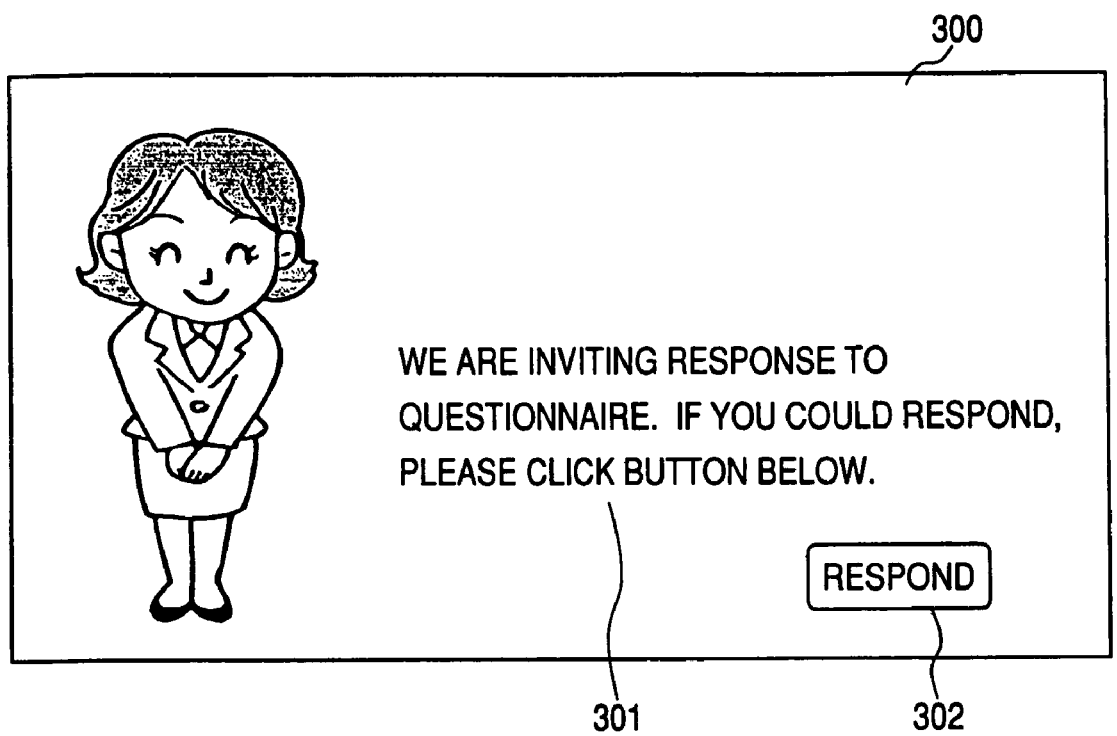
FIG. 14 is a diagram showing an example of display of a program content including guidance for a questionnaire.

FIG. 14 shows an example of display of the program content displayed on the display unit 137 in this way. In this example of display, a message 301 "We are inviting response to questionnaire. If you could respond, please click button below." is displayed in an image 300 of the program content. A "respond" button 302 serving as a trigger content is displayed on the right below the message 301. This "respond" button 302 is displayed for a predetermined time.

Since the "respond" button 302 is an extremely simple content, labor and cost required for creating the "respond" button 302 do not impose a very heavy burden on a carrier of the broadcasting apparatus 32-1.

On the other hand, in step S42, the trigger content extracting unit 132 extracts data (a program) corresponding to the trigger content displayed, supplies the data to the register storing unit 133, and causes the register storing unit 133 to store the data.

Figure 15:
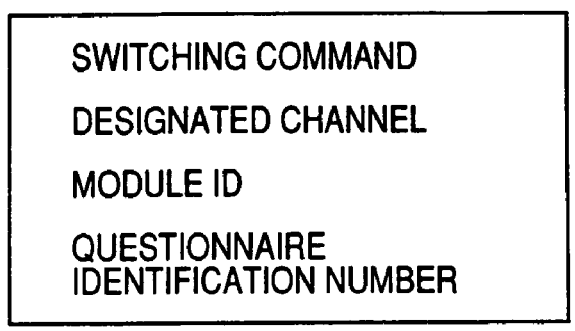
FIG. 15 is a diagram showing an example of data included in a trigger content.

FIG. 15 shows an example of data described in the trigger content (the program). In the example in FIG. 15, a switching command, a designated channel, a module ID, and a questionnaire identification number are described. The designated channel represents a broadcast channel to be switched (in this case, the broadcast channel of the broadcasting apparatus 31) when a viewer operates the remote commander 201 to click the "respond" button 302. The switching command is a command for causing the receiving unit 134 to receive a broadcast channel designated in the designated channel. The module ID and the questionnaire identification number are identification numbers for identifying a transaction contents that should be extracted out of transaction contents broadcasted on the designated channel (transaction contents of the broadcasting apparatuses 32-1 to 32-3 are multiplexed) (one module out of plural transaction contents (modules) of the broadcasting apparatuses 32-1 to 32-2) (FIGS. 10 and 11).

Subsequently, in step S43, the judging unit 132 judges whether response to the questionnaire is instructed by the viewer on the basis of an input from the reception unit 131. Specifically, the judging unit 132 judges whether the "respond" button 302 in FIG. 14 is clicked. When the viewer responds to the questionnaire, the viewer operates the direction buttons 203 of the remote commander 201 to arrange the not-shown cursor on the "respond" button 302 and operates the decision button 204 to instruct response to the questionnaire.

When it is judged in step S43 that response is instructed by the viewer, the broadcasting apparatus 31 proceeds to step S44. The G register setting unit 141 sets the module ID and the questionnaire identification number of the trigger content stored in the trigger content storing unit 152 in the G register built therein. In step S45, the judging unit 132 controls the reception channel setting unit 133 and instructs switching of a channel to be received. At this point, the reception channel setting unit 133 controls the receiving unit 134 to switch a channel to be received to the designated channel (FIG. 15) stored in the G register setting unit 141. The receiving unit 134 switches, on the basis of this control, a broadcast channel to be received from the broadcast channel of the broadcasting apparatus 32-1, which has been used, to the broadcast channel of the broadcasting apparatus 31 (the designated channel) and receives the broadcast channel after switching.

In step S46, the data content processing unit 136 extracts a module (a transaction content) of the module ID stored in the register out of the data received by the receiving unit 134 and outputs the module to the display unit 137. In step S47, the data content processing unit 136 selects the transaction content for input of a response to the questionnaire on the basis of the questionnaire identification number stored in the register, outputs the transaction content to the display unit 137, and causes the display unit 137 to display the transaction content.

Figure 16:
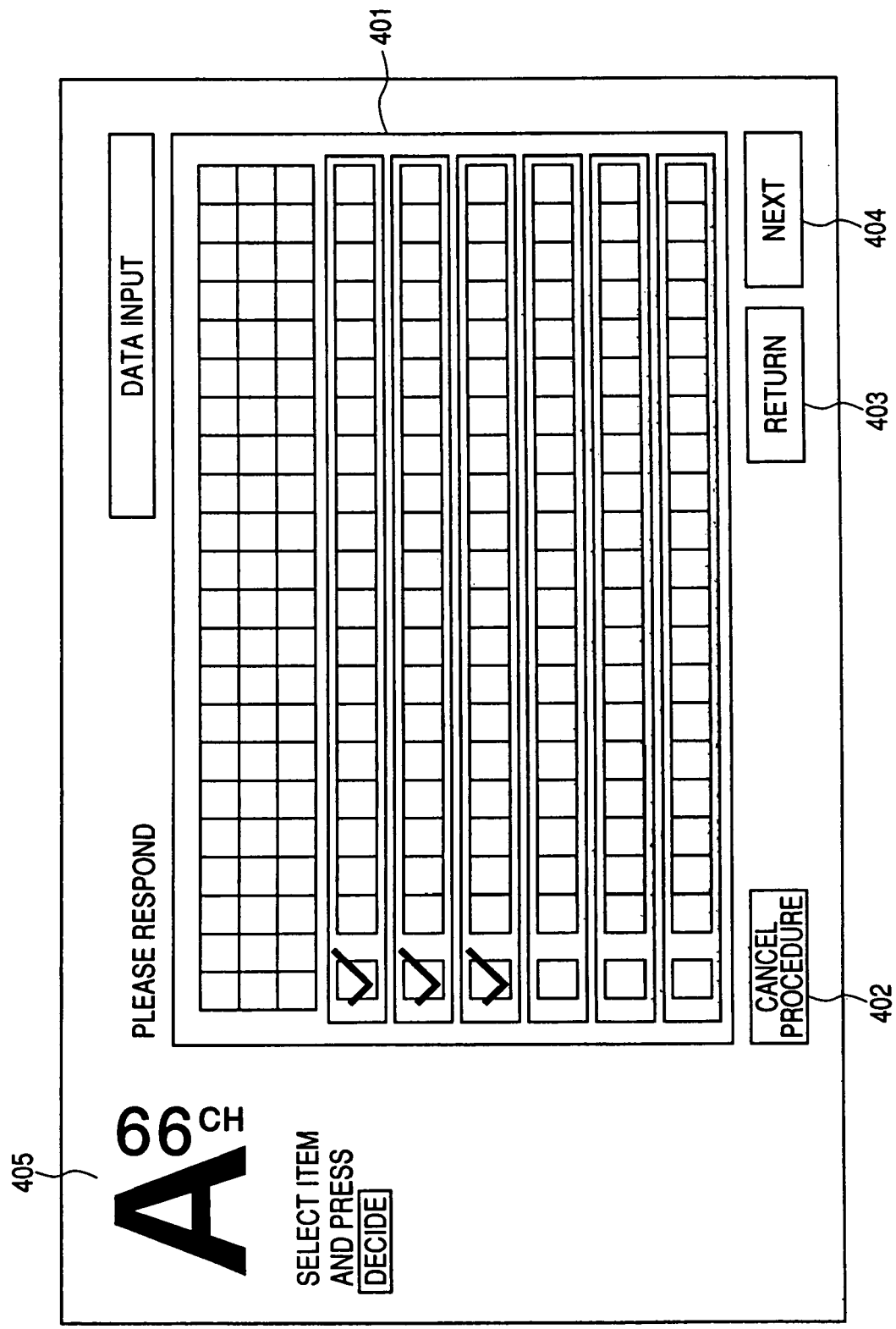
FIG. 16 is a diagram showing an example of a transaction content for inputting a response to a questionnaire.

FIG. 16 shows an example of the transaction content displayed on the display unit 137. In this example, an image of a selection board 401 in which plural responses are inputted in response to a questionnaire is displayed. Note that, although characters are not displayed in the example of display in FIG. 16, actually, characters as responses to the questionnaire are displayed in respective rows. A "cancel procedure" button 402 that is operated in canceling a procedure is displayed on the left below the selection board 401. A "return" button 403 that is operated in returning a screen and a "next" button 404 that is operated in advancing a screen to the next screen are displayed on the right below the selection board 401.

A logo 405 is displayed on the left above the selection board 401. This logo 405 is not a logo of the broadcast channel broadcasted by the broadcasting apparatus 31 but a logo of the object channel (in this case, the broadcast channel of the broadcasting apparatus 32-1).

Therefore, although the broadcast channel is switched from the broadcast channel of the broadcasting apparatus 32-1 to the broadcast channel of the broadcasting apparatus 31 actually, it is possible to provide the viewer with continuity that causes the viewer to feel as if the channel is not switched.

Figure 17:
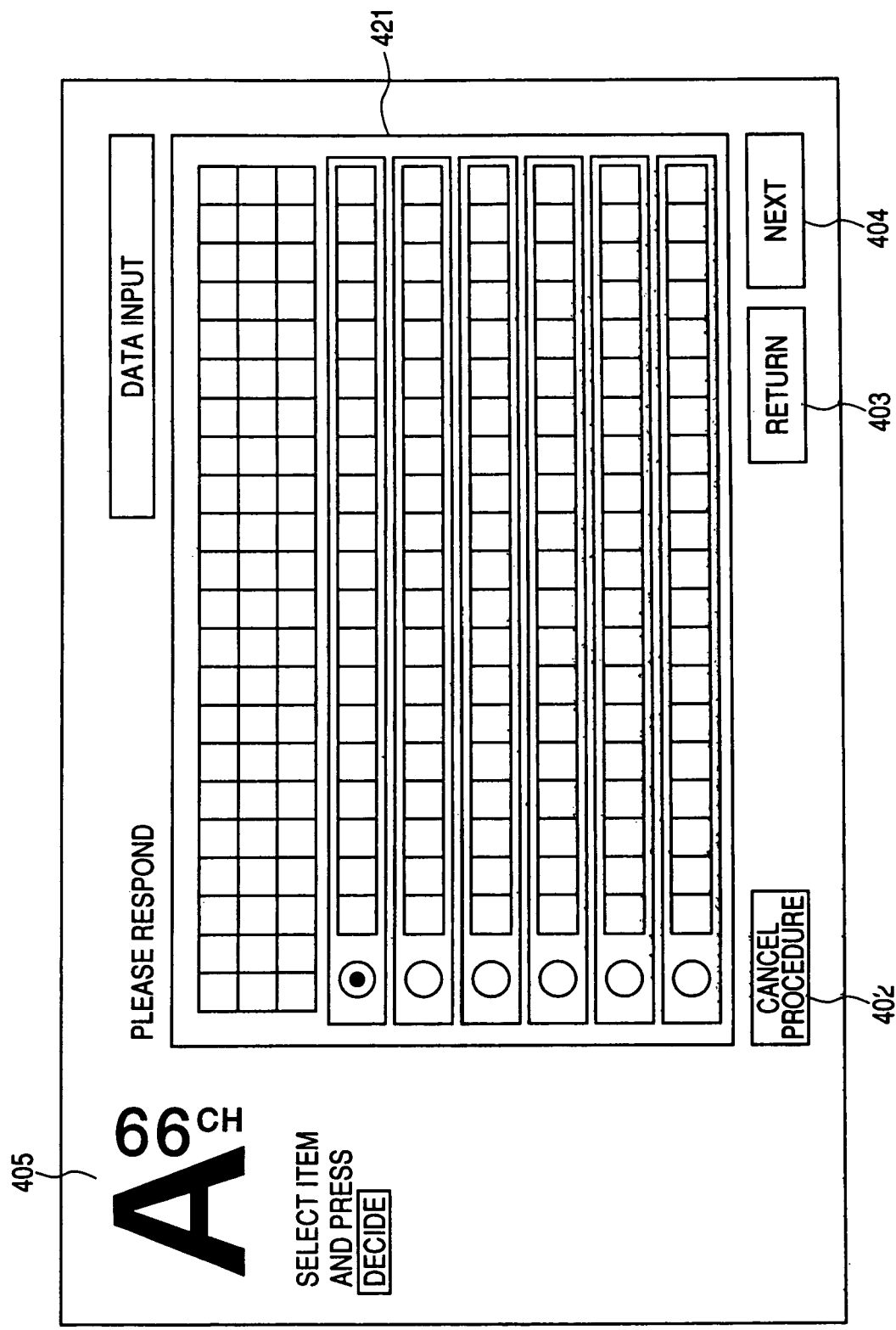
FIG. 17 is a diagram showing an example of the transaction content for inputting a response to a questionnaire.

FIG. 17 shows another example of display of a screen of a transaction content for inputting the response to the questionnaire displayed in step S47. This example of display represents an example of display in the case in which only one response is selected and displayed. In this example of display, when any one of the rows of the selection board 421 is selected, selection of the other rows is canceled.

Figure 18:
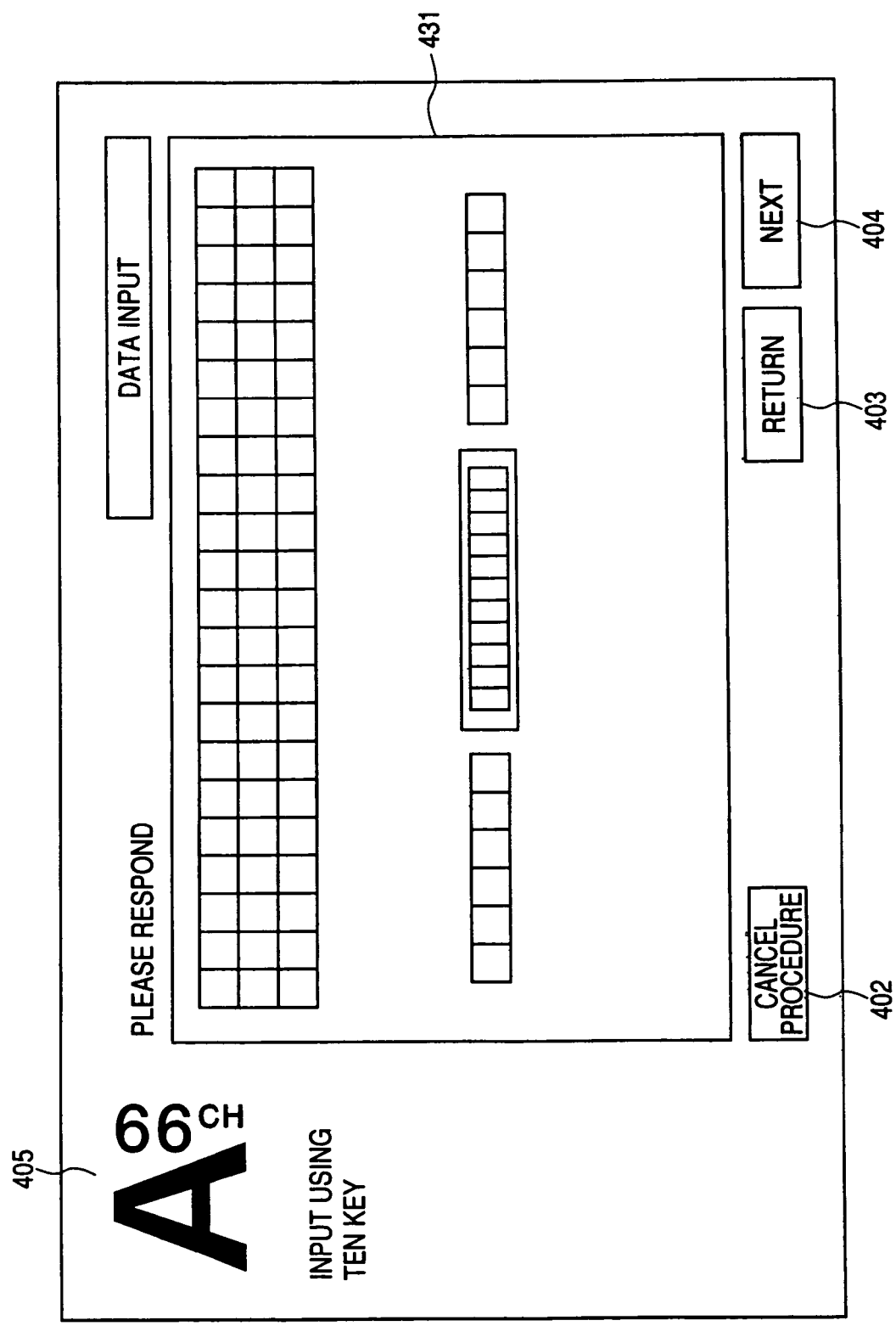
FIG. 18 is a diagram showing an example of the transaction content for inputting a response to a questionnaire.

FIG. 18 shows an example of a screen of a transaction content in which a numerical value is inputted. In this case, the viewer operates the numerical buttons 202 of the remote commander 201 to sequentially input numerals in an input board 431. When one numeral is inputted, a cursor is automatically moved in the right direction sequentially. Thus, the viewer can sequentially input a numeral in a position where the cursor is displayed at that point.

Figure 19:
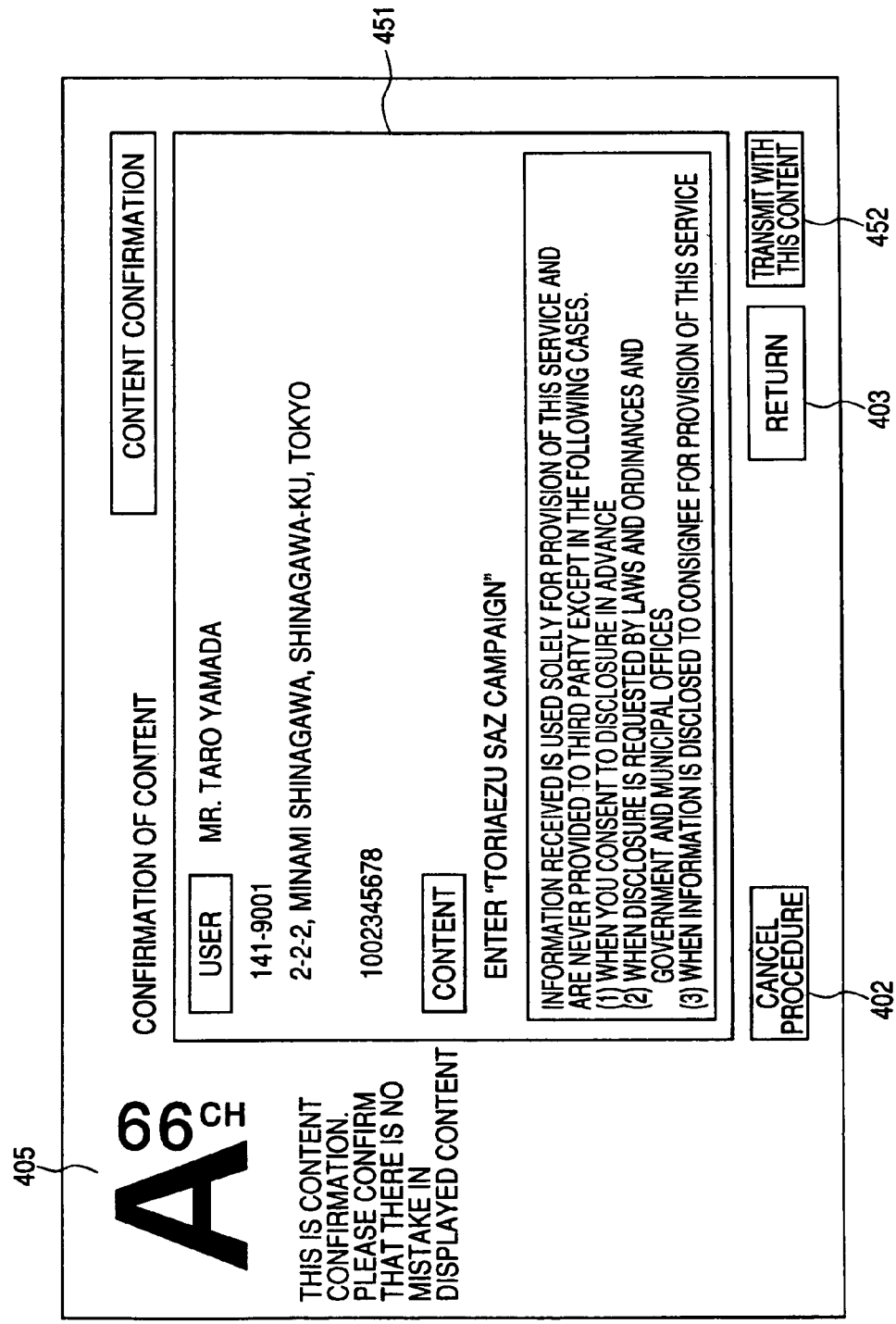
FIG. 19 is a diagram showing an example of a transaction content for confirming a response to a questionnaire.

In an example in FIG. 19, a board 451 for confirming the contents inputted is displayed. The contents inputted to that point are displayed on this board 451. The viewer can confirm the inputs to that point by looking at the contents displayed on the board 451.

In this example, a "transmit with this content" button 452 is displayed on the right below the board 451 instead of the "next" button 404 that has been displayed. If the viewer confirms the content of the board 451 and accepts the content, the viewer operates this "transmit with this content" button 452.

The viewer selects the selection boards 401 and 421 shown in FIGS. 16 and 17 or inputs numerals in the input board 431 shown in FIG. 18 by operating the remote commander 201. The reception unit 131 receives this input in step S48. The data received by the reception unit 131 is stored in a memory built therein. In step S47, the reception unit 131 judges whether the input has been completed. If the input has not been completed yet, the broadcasting apparatus 31 returns to step S48 and repeatedly executes the processing in step S48 and the subsequent steps.

Figure 20:
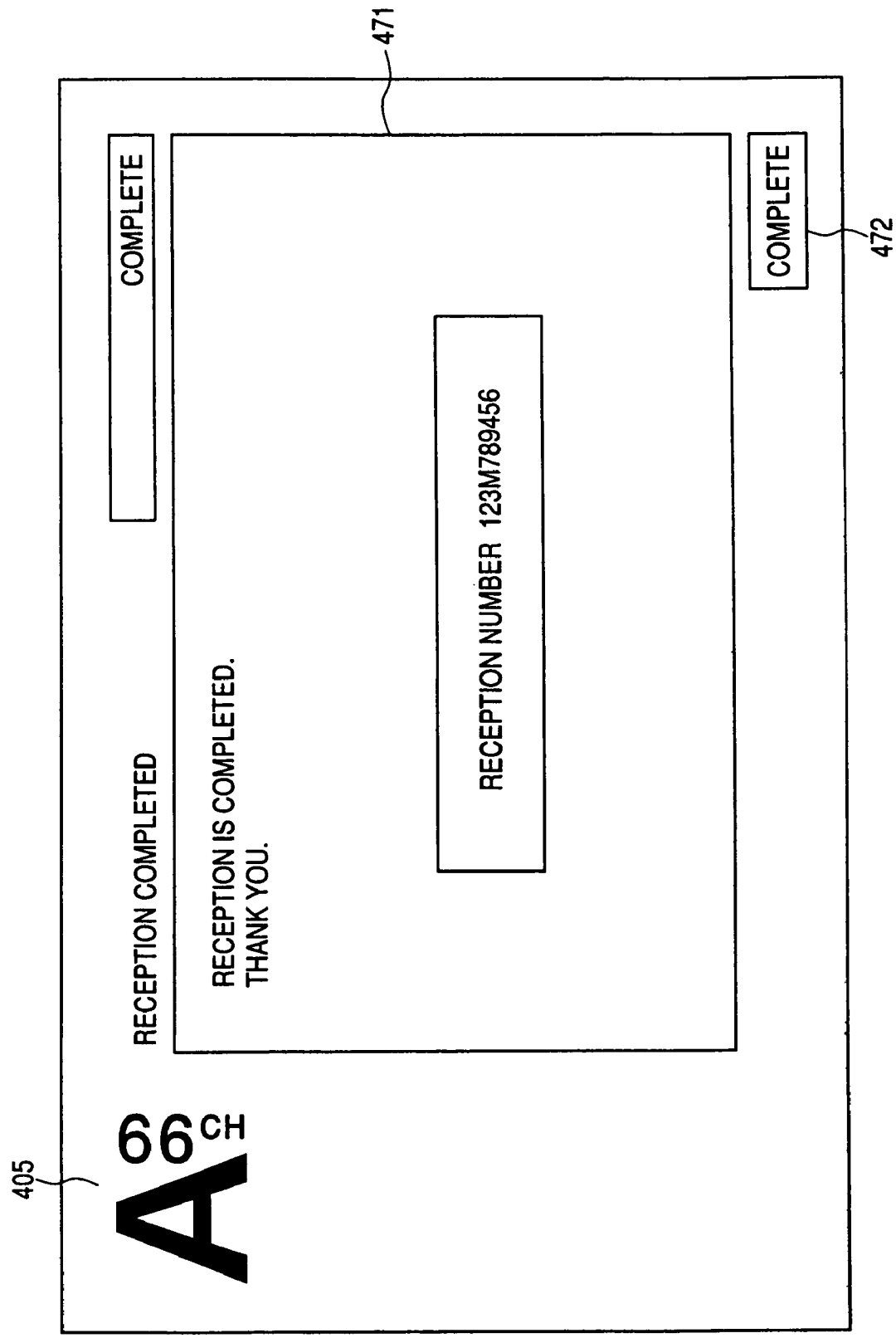
FIG. 20 is a diagram showing an example of a transaction content indicating completion of reception.

When the input is completed, the viewer operates the remote commander 201 to click a "complete" button 472 in a screen in FIG. 20 displayed at the time of input of a response to the questionnaire. At this point, it is judged in step S49 that the input has been completed. In step S50, the judging unit 132 notifies the communication unit 138 to that effect. At this point, the data such as the response to the questionnaire stored in the memory of the reception unit 131 is also supplied to the communication unit 138.

The communication unit 138 adds user information read out from the user information storing unit 140 and adds the module ID stored in the trigger content storing unit 152 to the questionnaire response input inputted from the reception unit 131 to create a communication telegram.

Figure 21:
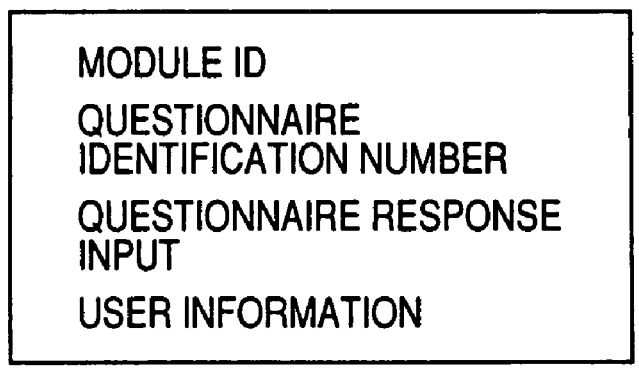
FIG. 21 is a diagram showing an example of a communication telegram.

FIG. 21 shows an example of the communication telegram generated in this way. A module ID, a questionnaire identification number, a questionnaire response input, and user information are stored in this communication telegram.

Moreover, in step S50, the communication unit 138 transmits the generated communication telegram to a transmission destination (in this case, the data center apparatus 41) via the network 10. This transmission destination is described in the transaction content received in the processing in step S46.

When the data center apparatus 41 receives this communication telegram, the data center apparatus 41 transmits an end graph (an error code) representing whether the communication telegram is received correctly, a reception number for identifying the contents received, and a reception date and time to the communication unit 138. When the communication unit 138 receives these data from the data center apparatus 41 in step S51, the communication unit 138 supplies the data to the telegram storing unit 153 and causes the telegram storing unit 153 to store the data.

The data content processing unit 136 reads out the data stored in the telegram storing unit 153 and causes the display unit 137 to display a message corresponding to the data. In the example in FIG. 20, a reception number "123M789456" is displayed and a message "Reception Completed. Thank you." is displayed. When an error code is received from the data center apparatus 41, for example, a message like "Try to send again after a while" is displayed.

In step S52, when completion of the input is notified from the judging unit 132, the reception channel setting unit 133 controls the receiving unit 134 to cause the receiving unit 134 to switch the reception channel to the object channel (described in the transaction content extracted in step S46). Consequently, the image of the program content broadcasted by the broadcasting apparatus 32-1 is displayed on the display unit 137 again.

When it is judged in step S43 that response is not instructed (when the "respond" button 302 in FIG. 14 is not operated), the processing in steps S44 to S52 is skipped.

As described above, the viewer (the user) responds to the questionnaire while being rarely aware that the transaction content is broadcasted on the broadcast channel different from that of the program content.

The carrier of the broadcasting apparatuses 32-1 to 32-3 can generate and prepare the transaction content shown in FIGS. 16 to 20. However, as described above, this takes considerable labor and time to increase cost. Thus, it is possible to realize a reduction in cost by requesting the carrier of the broadcasting apparatus 31 to generate the transaction content.

On the other hand, the carrier of the broadcasting apparatus 31 can make a profit by receiving a commission for the transaction content from the carriers of the broadcasting apparatuses 32-1 to 32-3.

As the transaction content, it is possible to prepare those peculiar to the broadcasting apparatuses 32-1 to 32-3 on the broadcasting apparatus 31 side. However, this increases cost. Thus, as shown in FIGS. 16 to 20, the respective kinds of boards (transaction contents) are prepared as templates and messages, colors, shapes, and the like to be inputted therein are slightly arranged for each broadcast channel. This makes it possible to provide transaction contents to the carriers of the broadcasting apparatuses 32 at low cost.

From the viewpoint of the viewer, this means that it is possible to use similar input interfaces when the viewer views any broadcast channel. Thus, an interface for input is prevented from changing every time a broadcast channel is changed to make the input difficult and take a long time for the input.

Figure 22:
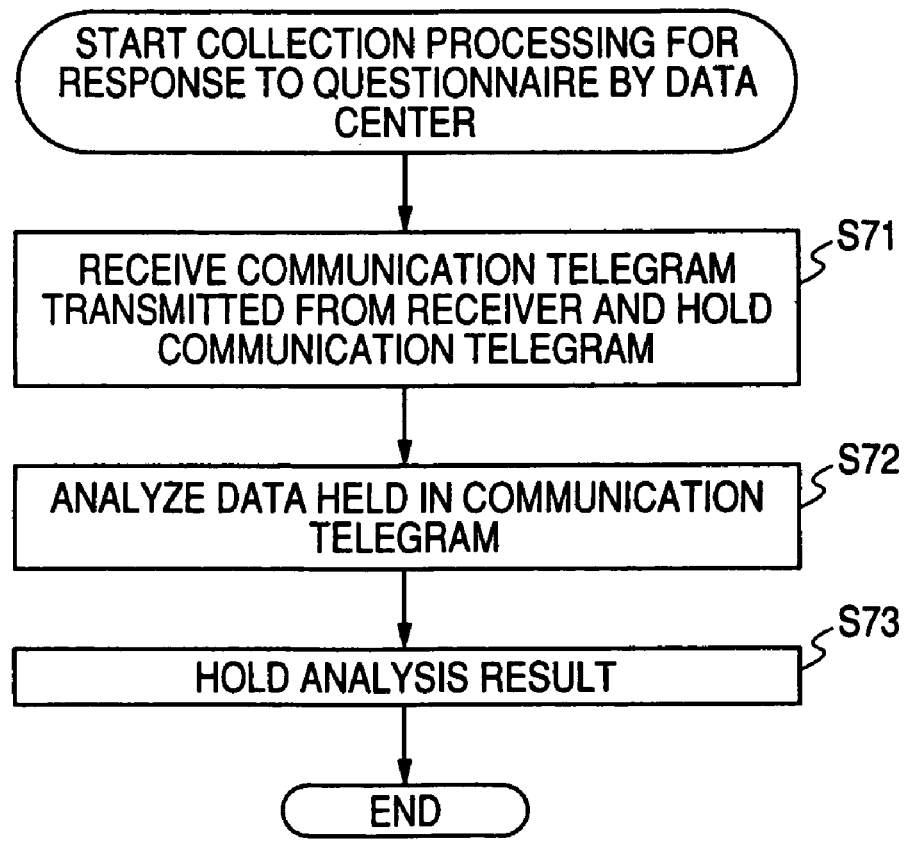
FIG. 22 is a flowchart for explaining questionnaire collection processing.

Responses to the questionnaire transmitted from the respective digital television receivers 18 via the network 10 (the processing in step S50 in FIG. 13) are collected by the data center apparatus 41. Processing in this case will be explained with reference to a flowchart in FIG. 22.

In step S71, the communication unit 111 receives a signal transmitted from the digital television receiver 18 via the network 10. The communication telegram shown in FIG. 21 is included in this signal. The transaction data extracting unit 112 extracts this communication telegram from the signal received by the communication unit 111 and holds the communication telegram the inside of the transaction data extracting unit 112.

When it is necessary to perform the processing on a real time basis, in step S72, the analyzing unit 113 analyzes a result of the questionnaire held in the communication telegram, which is extracted and held by the transaction data extracting unit 112. In step S73, the analyzing unit 113 stores the result analyzed in a storing unit built in the analyzing unit 113.

When it is unnecessary to perform the processing on a real time basis, the processing in steps S72 and S73 is executed off-line.

The broadcasting apparatus 32 receives provision of the result of the analysis at necessary timing and executes processing for reflecting the result of the analysis on the next broadcast according to circumstances.

In the above explanation, the transaction content is use as a content for responding to the questionnaire. However, it is also possible to use a content for selling a commodity as the transaction content. Processing in this case will be hereinafter explained.

Figure 23:
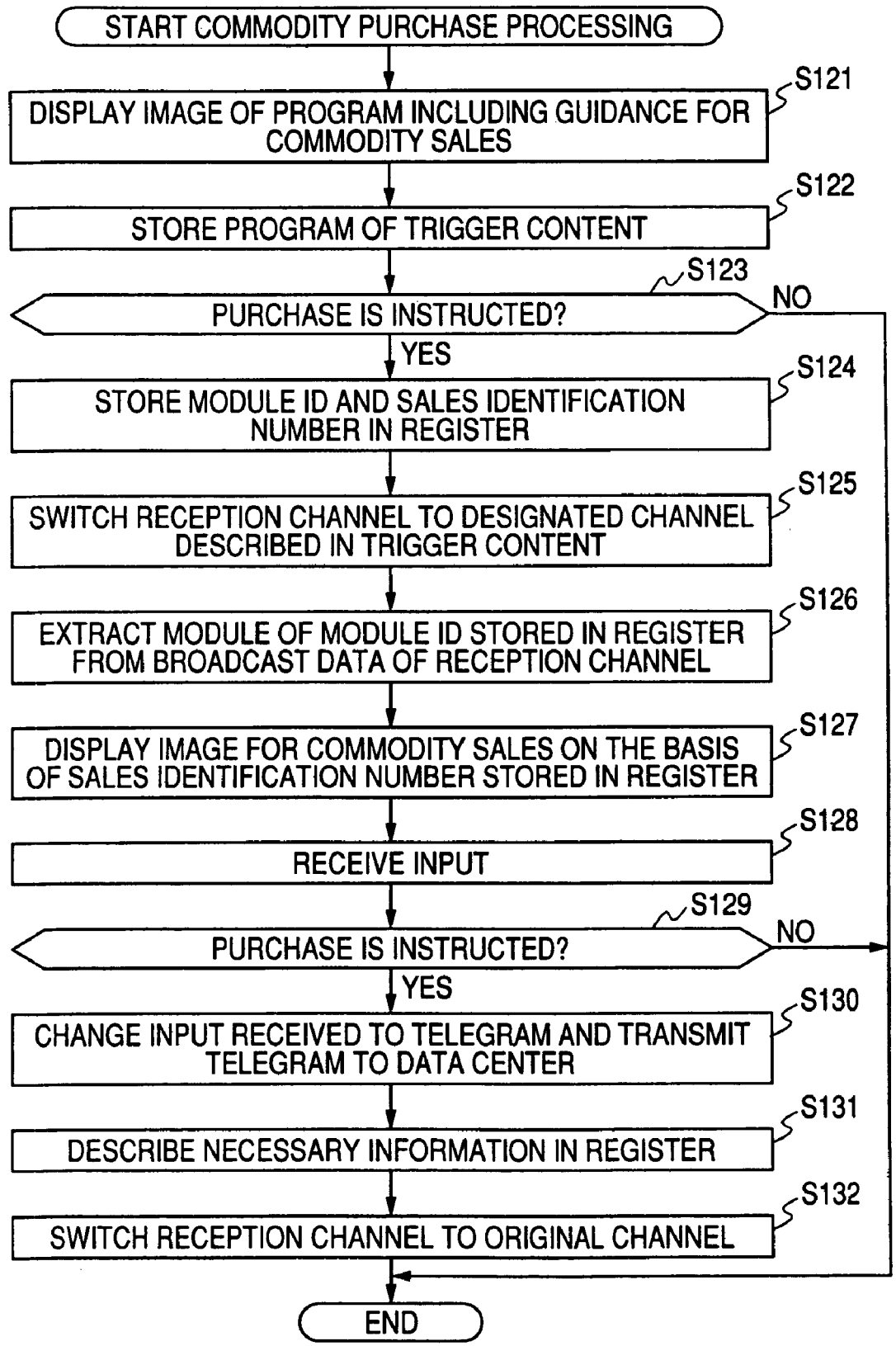
FIG. 23 is a flowchart for explaining processing for purchase of a commodity.

An example of processing in the digital television receiver 18 in the case in which a commodity is purchased on the basis of a program content including guidance for commodity sales is shown in a flowchart in FIG. 23.

Figure 24:
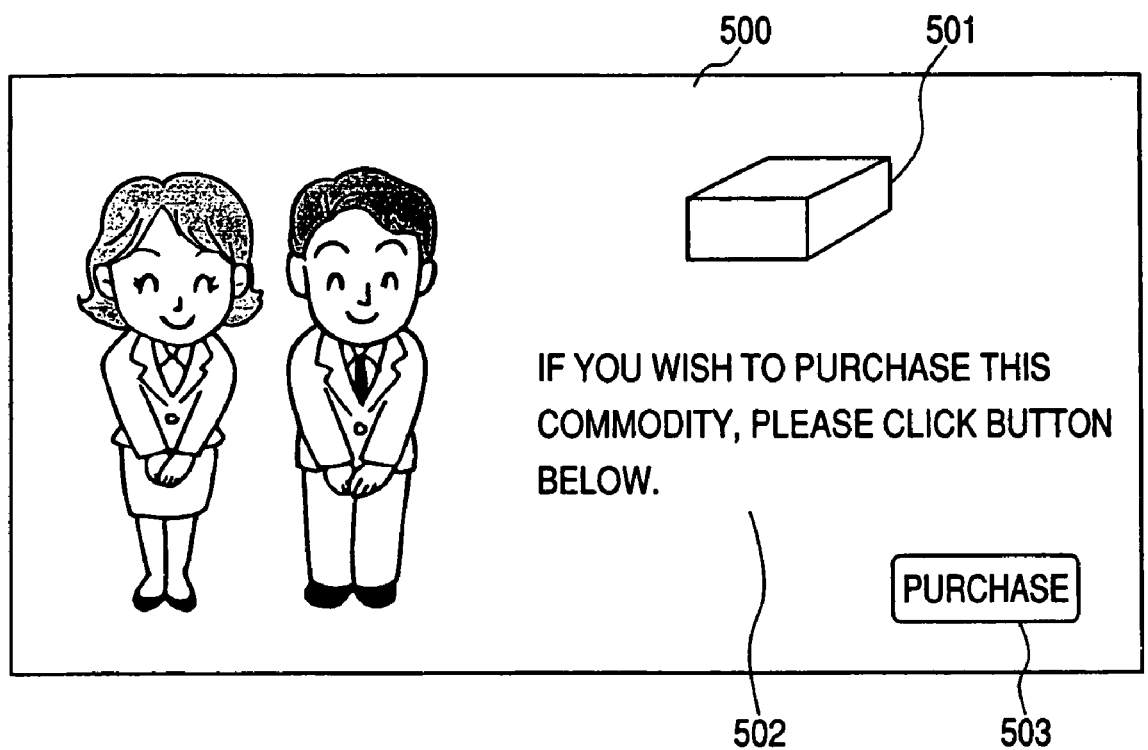
FIG. 24 is a diagram showing an example of a program content including a trigger content for purchase of a commodity.

In step S121, the receiving unit 134 of the digital television receiver 18 receives a signal broadcasted from the broadcasting apparatus 32. The video/sound processing unit 135 demodulates the signal received and causes the display unit 137 to display a program content. FIG. 24 shows an example of the program content displayed on the display unit 137 in this way.

In the example in FIG. 24, an image 501 of a sale object commodity and a message 502 "If you wish to purchase this commodity, please click button below." for selling the commodity are displayed in an image 500 of the program content. A "purchase" button 503 is displayed on the right below the message 502. This "purchase" button 503 is a trigger content combined with the program content 500 as a part of the program content 500.

In step S122, the data content processing unit 136 extracts the trigger content from the signal received by the receiving unit 134, supplies the trigger content to the trigger content storing unit 152, and causes the trigger content storing unit 152 to store the trigger content.

When the viewer looks at the program content and purchases the commodity, the viewer operates the remote commander 201 to click the "purchase" button 503. In step S123, the judging unit 132 monitors an input from the reception unit 131 and judges whether the "purchase" button 503 is clicked, that is, whether purchase is instructed. When it is judged that purchase is instructed, in step S124, the G register setting unit 141 sets a module ID and a sales identification number of the trigger content stored in the trigger content storing unit 152 in the G register. Subsequently, in step S125, the judging unit 132 notifies the reception channel setting unit 133 that purchase is instructed. At this point, the reception channel setting unit 133 controls the receiving unit 134 to switch a channel to be received to a designated channel stored in the trigger content storing unit 152. The receiving unit 134 switches the reception channel to the designated channel (the broadcast channel of the broadcasting apparatus 31) on the basis of this control.

In step S126, the data content processing unit 136 extracts a module of the module ID stored in the register from the digital television signal, which is broadcasted by the broadcasting apparatus 31, received by the receiving unit 134. In step S127, the data content processing unit 136 extracts the transaction content for commodity sales on the basis of the sales identification number stored in the register and outputs the transaction content to the display unit 137. This module ID indicates a transaction content corresponding to the trigger content of the "purchase" button 503 in FIG. 24. As a result, in step S127, the transaction content for commodity sales is displayed on the display unit 137. The viewer inputs user information and various kinds of information on the basis of this transaction content. In step S128, the input inputted by the viewer is received by the reception unit 131.

FIGS. 25 to 29 show an example of display of the transaction content displayed on the display unit 137 in this way.

Figure 25:
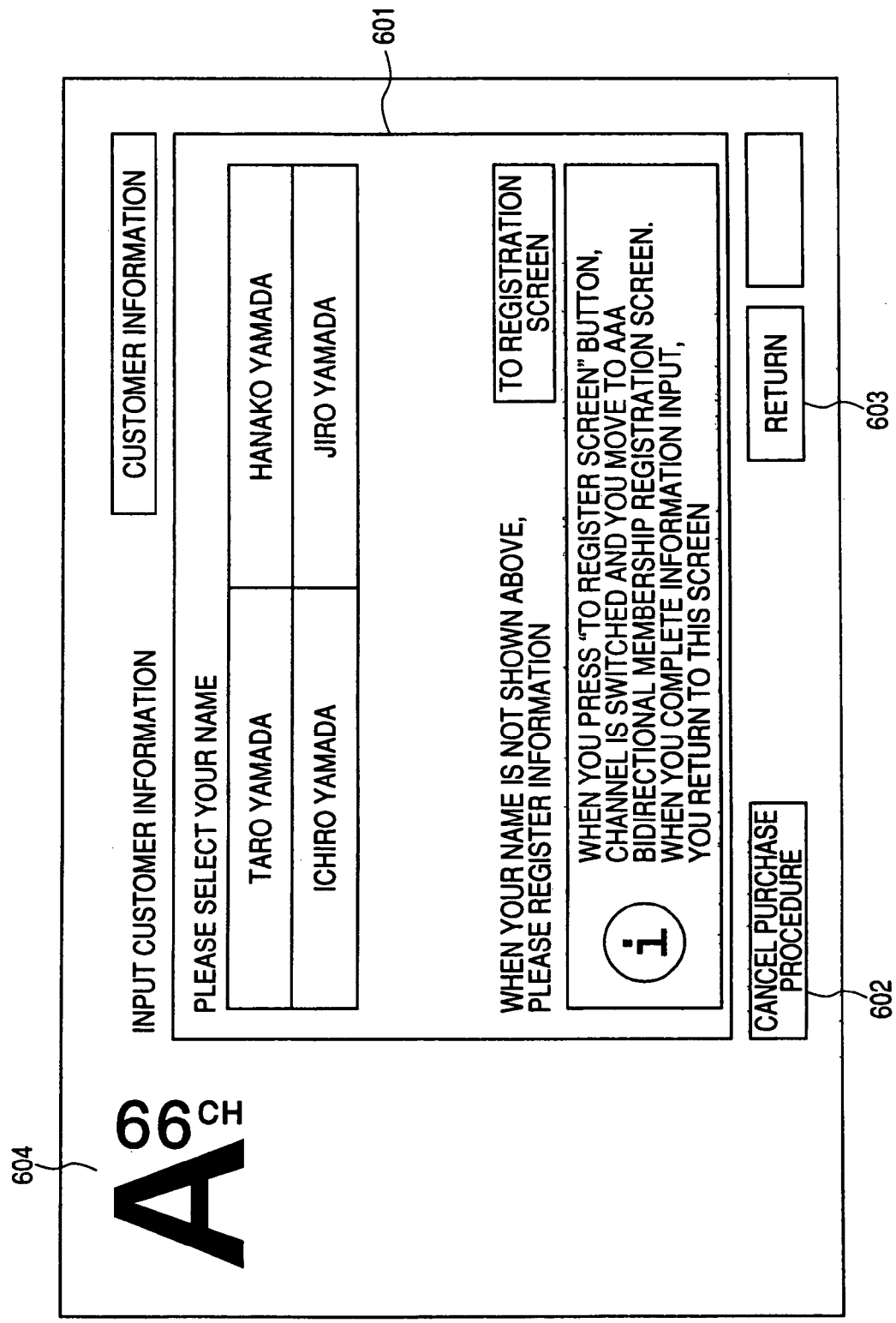
FIG. 25 is a diagram showing an example of a transaction content selection of a user.

The example of display in FIG. 25 represents an example of display for inputting a user. In this example of display, names of family members registered in an input board 601 in advance are displayed. In the case of this example, names of four family members, "Taro Yamada", "Hanako Yamada", "Ichiro Yamada", and "Jiro Yamada", are registered in advance. The viewer operates the remote commander 201 to select a name of the viewer himself/herself out of the names registered in advance. This makes it possible to input user information easily.

A "cancel purchase procedure" button 602 is displayed on the left below the input board 601. This button is operated in canceling a purchase procedure. A "return" button 603 is displayed on the right below the input board 601. This button is operated in returning a screen to a previous screen.

A logo 604 of the broadcast channel of the broadcasting apparatus 32-1 is displayed on the left above the input board 601. Therefore, in this case, again, the view does not recognize that this transaction content is transmitted from the broadcasting apparatus 31 but recognizes that this transaction content is transmitted from the broadcasting apparatus 32-1.

FIG. 26 is an example of display for inputting an e-mail address in the case in which a "keyboard type" button is selected in an input board 621. In this example of display, various buttons of alphabetical characters and signs necessary for inputting an e-mail address are displayed on the input board 621. The viewer operates the remote commander 201 to select predetermined buttons and input an e-mail address of the viewer himself/herself.

A "next" button 622 is displayed on the right below this input board 621. The viewer can advance the display to the next screen by operating this button.

Figure 27:
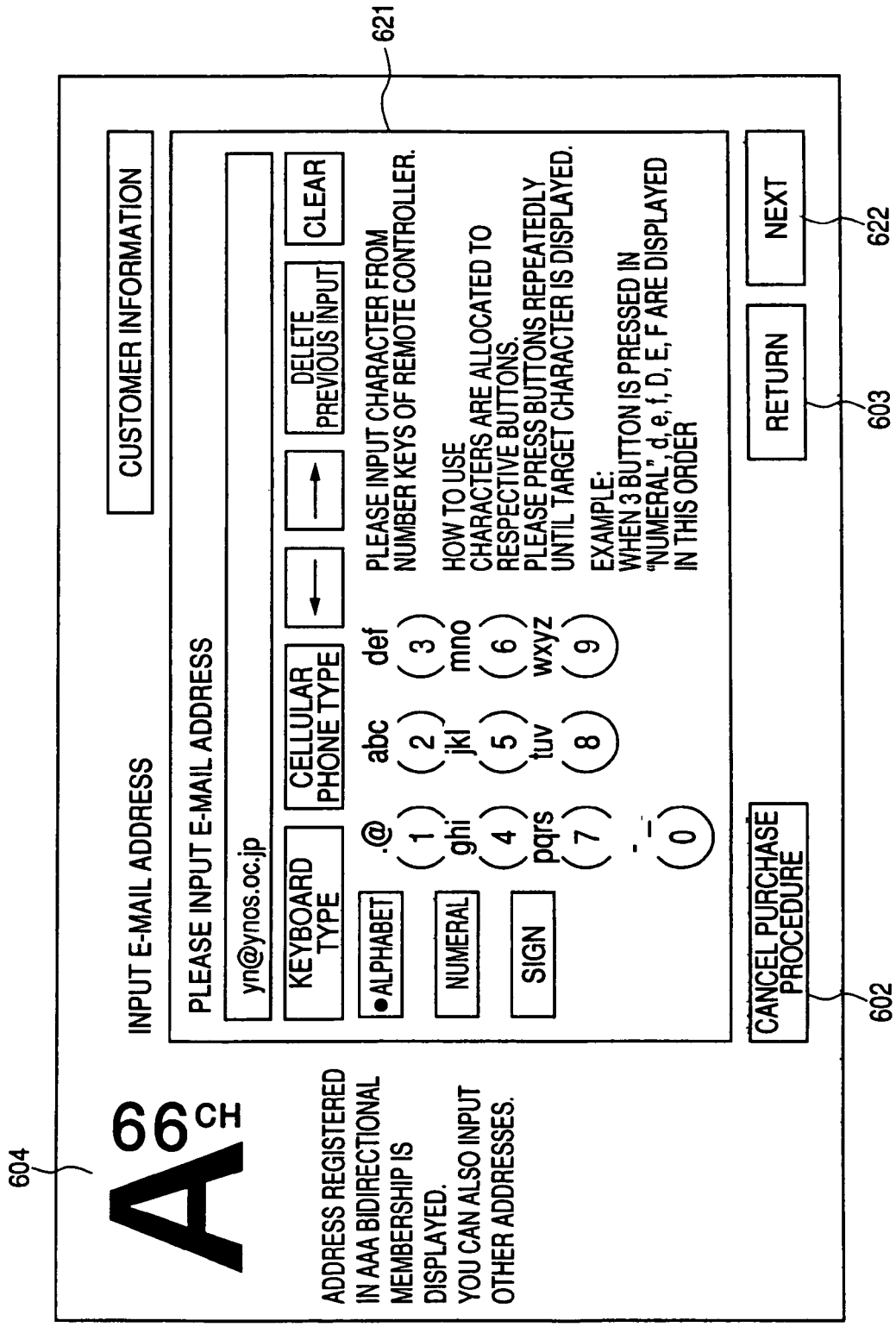
FIG. 27 is a diagram showing an example of the transaction content for input of an e-mail address.

FIG. 27 shows an example of display in the case in which a "cellular phone type" button is selected in the input board 621. In this case, as in the case in a cellular phone, basically, the viewer selects any one of ten areas arranged in 3×3+1 positions and selects the areas a necessary number of times, whereby characters are inputted.

Figure 28:
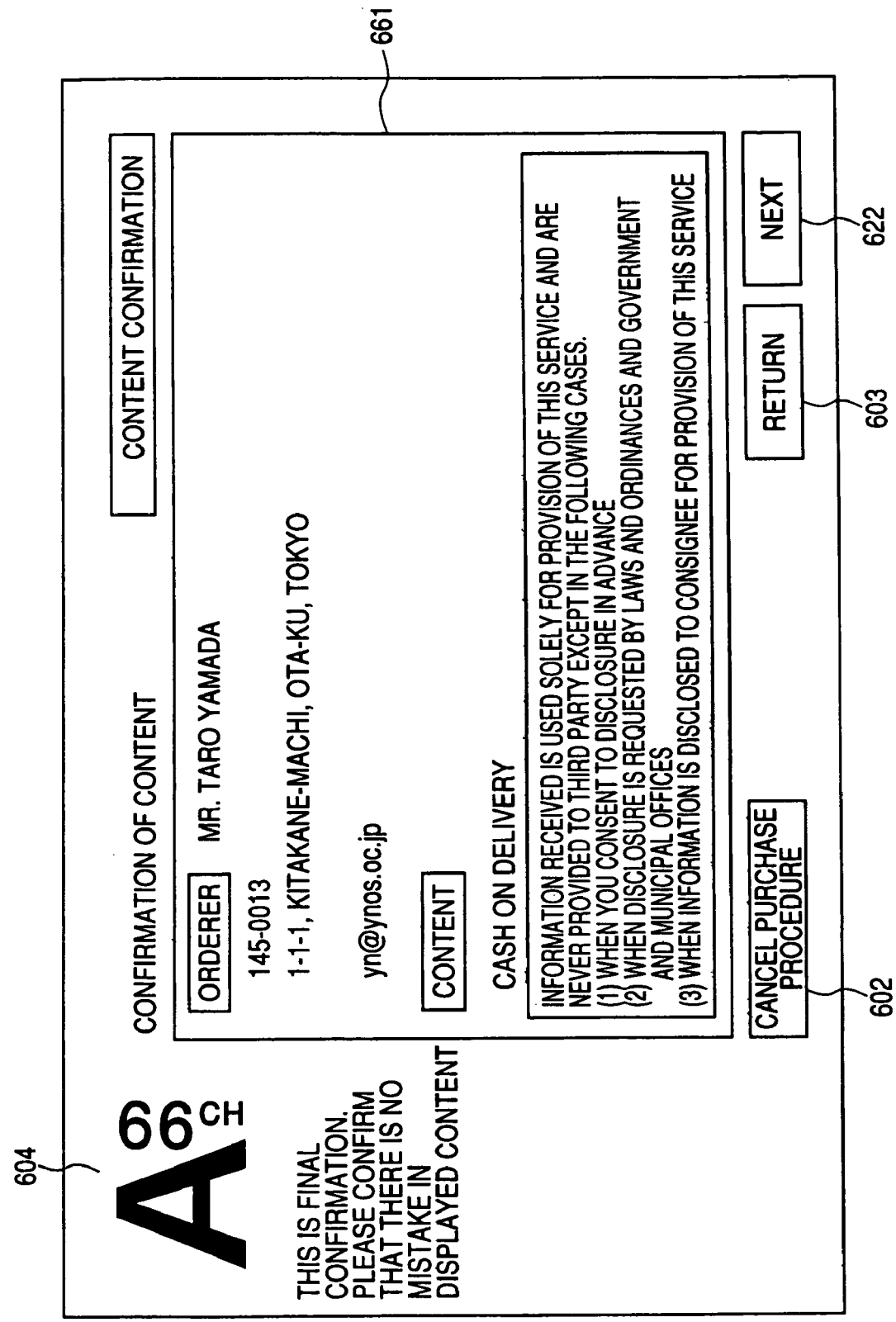
FIG. 28 is a diagram showing an example of a transaction content for confirmation of a content.

FIG. 28 shows an example of display of a transaction content in confirming user information. In this example of display, a name, an address, and an e-mail address of an orderer are displayed on a board 661.

Figure 29:
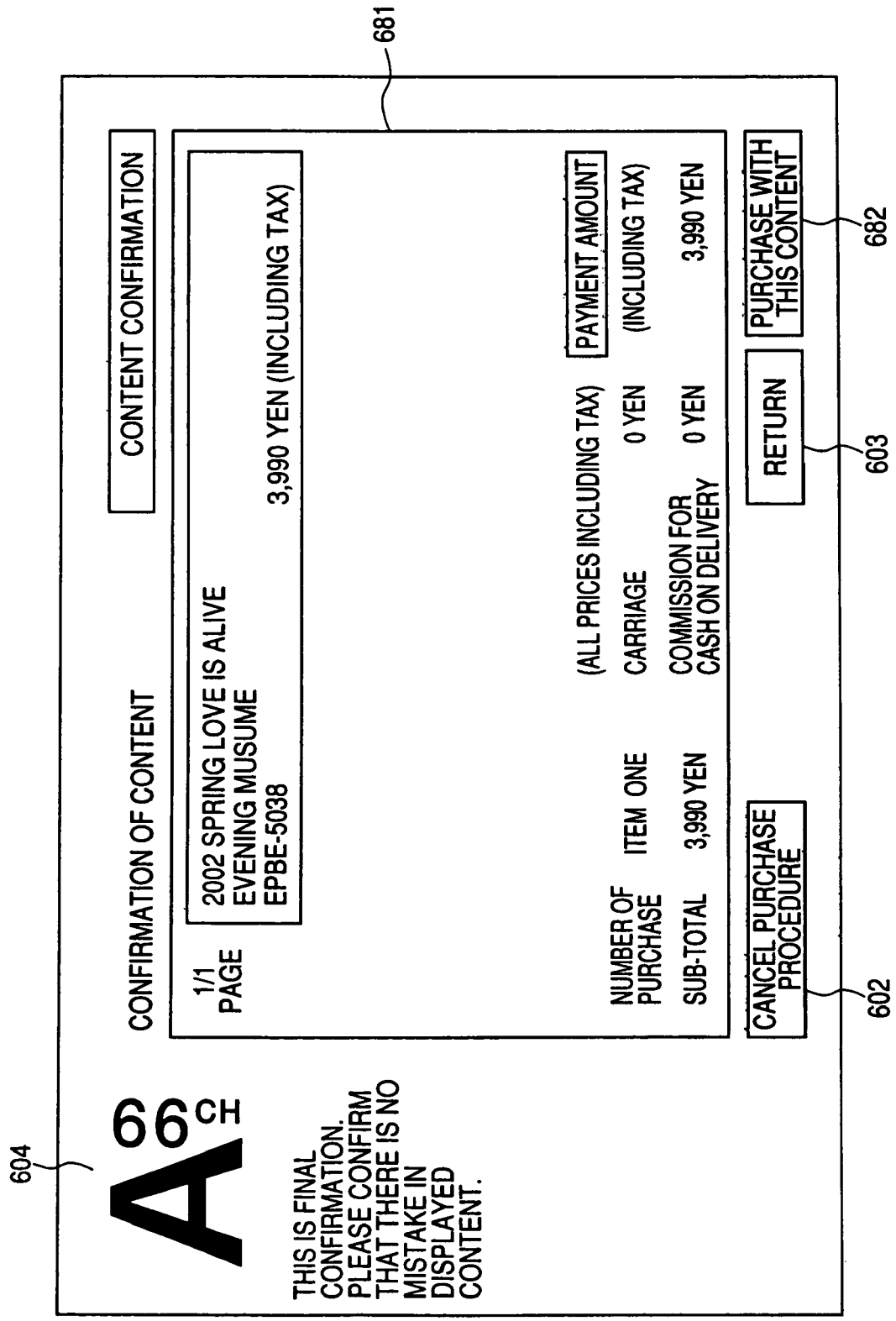
FIG. 29 is a diagram showing an example of the transaction content for confirmation of a content.

FIG. 29 shows an example of display of a transaction content in confirming a purchased commodity. In this example of display, a name, a sign, and a purchase amount of a purchased commodity are displayed on a board 681. A "purchase with this content" button 682 is displayed on the right below of the board 681. The viewer confirms purchase information on the board 681 and, then, when the viewer purchases the commodity, operates the "purchase with this content" button 682.

In step S129, the judging unit 132 judges whether purchase is instructed by the viewer. Specifically, the judging unit 132 judges whether the "purchase with this content" button 682 shown in FIG. 29 is clicked. When it is judged that purchase is instructed, the digital television receiver 18 proceeds to step S130 and performs processing for changing the received input to a telegram and transmits the telegram to the data center apparatus 41. The communication unit 138 stores the input from the viewer received by the reception unit 131 in the memory in the inside of the communication unit 138. The user information read out from the user information storing unit 140 is also stored in this memory. The communication unit 138 creates a communication telegram on the basis of the data stored.

FIG. 30 shows an example of the communication telegram set in this way. In this example, other than the module ID, the sales identification number, and the user information, information on the purchased commodity is described.

As the information on the purchased commodity, a name, a number, and the number of items of the commodity are described and a total amount and a total amount including carriage are described. In addition, information on a distributor is described. The name and the number of the commodity is information for identifying the commodity to be sold. The price is a sales price of the commodity. The carriage is carriage for delivering the commodity. The viewer is charged with the price and the carriage as well as a consumption tax.

An e-mail address of the distributor is an e-mail address of the distributor on the network 10 that is used in ordering the commodity. An address and a telephone number are an address and a telephone number for making contact with the distributor.

Besides, information on a delivery destination and a user is described. The delivery destination represents a delivery destination of the commodity inputted by the viewer. As the information on the user, other than the user identification number, an address, a telephone number, an e-mail address, and a credit card number of the user are described.

Figure 31:
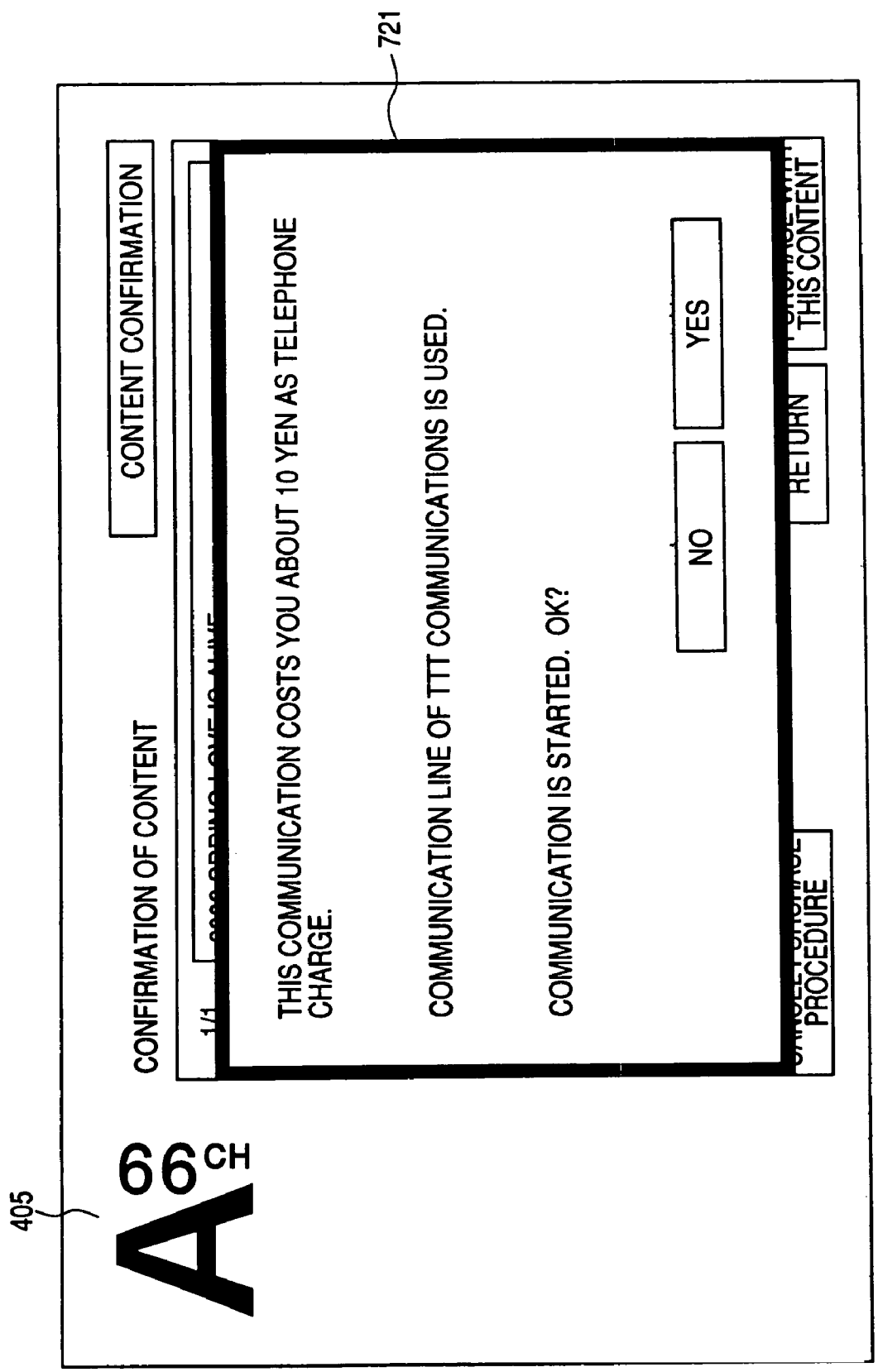
FIG. 31 is a diagram showing an example of a transaction content for confirmation of a communication charge.
Figure 32:
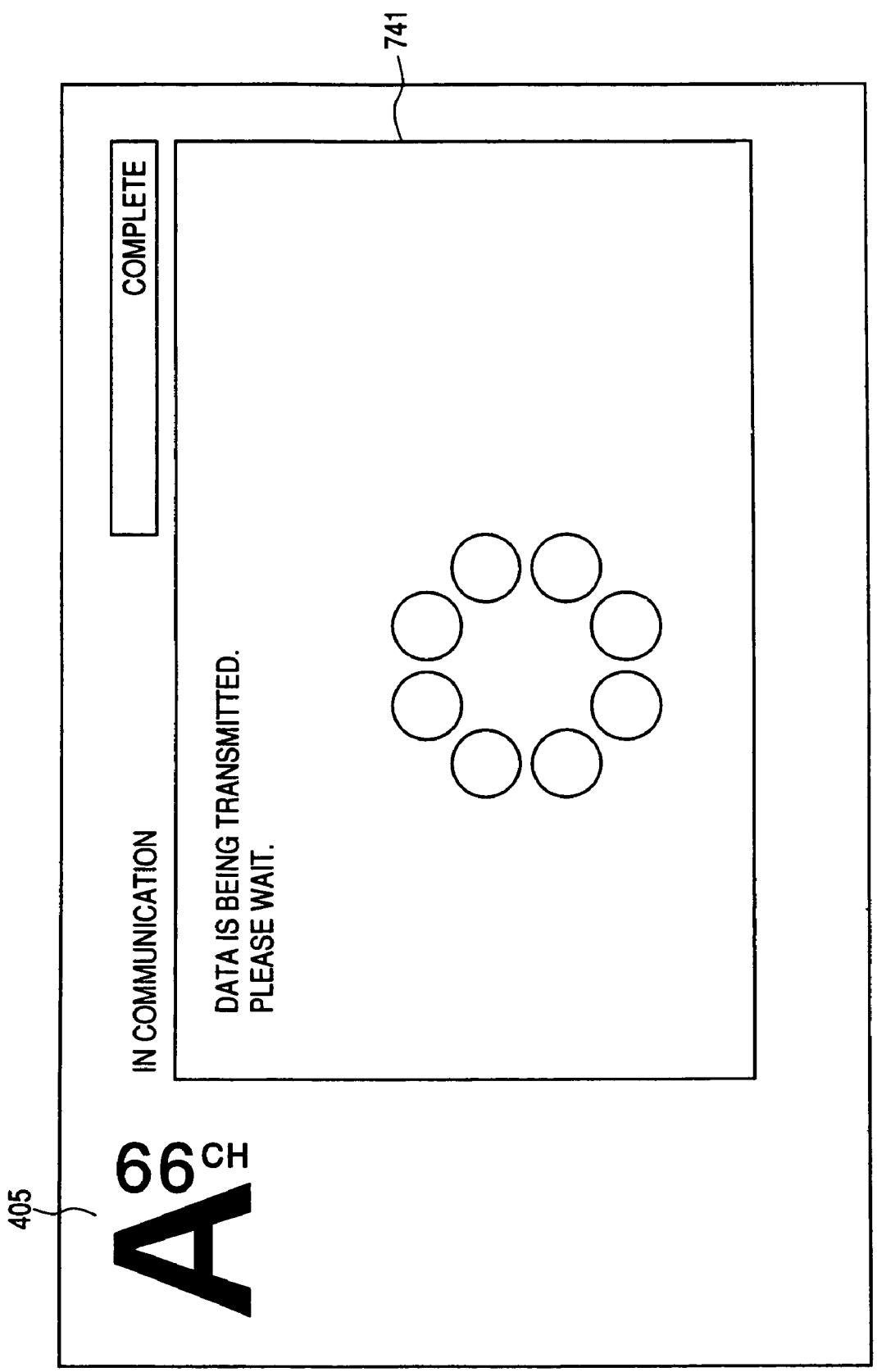
FIG. 32 is a diagram showing an example of a transaction content indicating that communication is performed.

In the transmission processing in step S130, the transaction contents shown in FIGS. 31 and 32 are further displayed.

FIG. 31 shows an example of display for confirming that the viewer is charged for the communication. In this example, a communication charge is displayed on a board 721. A "no" button and a "yes" button are displayed on the right below the board 721. The viewer selects the "yes" button when the viewer consents to the communication charge. When the "no" button is selected, the purchase processing is suspended.

FIG. 32 shows an example of display of a transaction content in the case in which the telegram created inside the digital television receiver 18 is being transmitted to the data center apparatus 41. In this example of display, a message indicating that the digital television receiver 18 is in communication is displayed on a board 741.

After the processing in step S130, in step S131, the communication unit 138 supplies an end flag and a reception date and time, which are transmitted from the data center apparatus 41, to the telegram storing unit 153 and causes the telegram storing unit 153 to store the end flag and the reception date and time. The information stored is read out on the basis of a command of the data content processing unit 136 and displayed as shown in FIG. 33.

Figure 33:
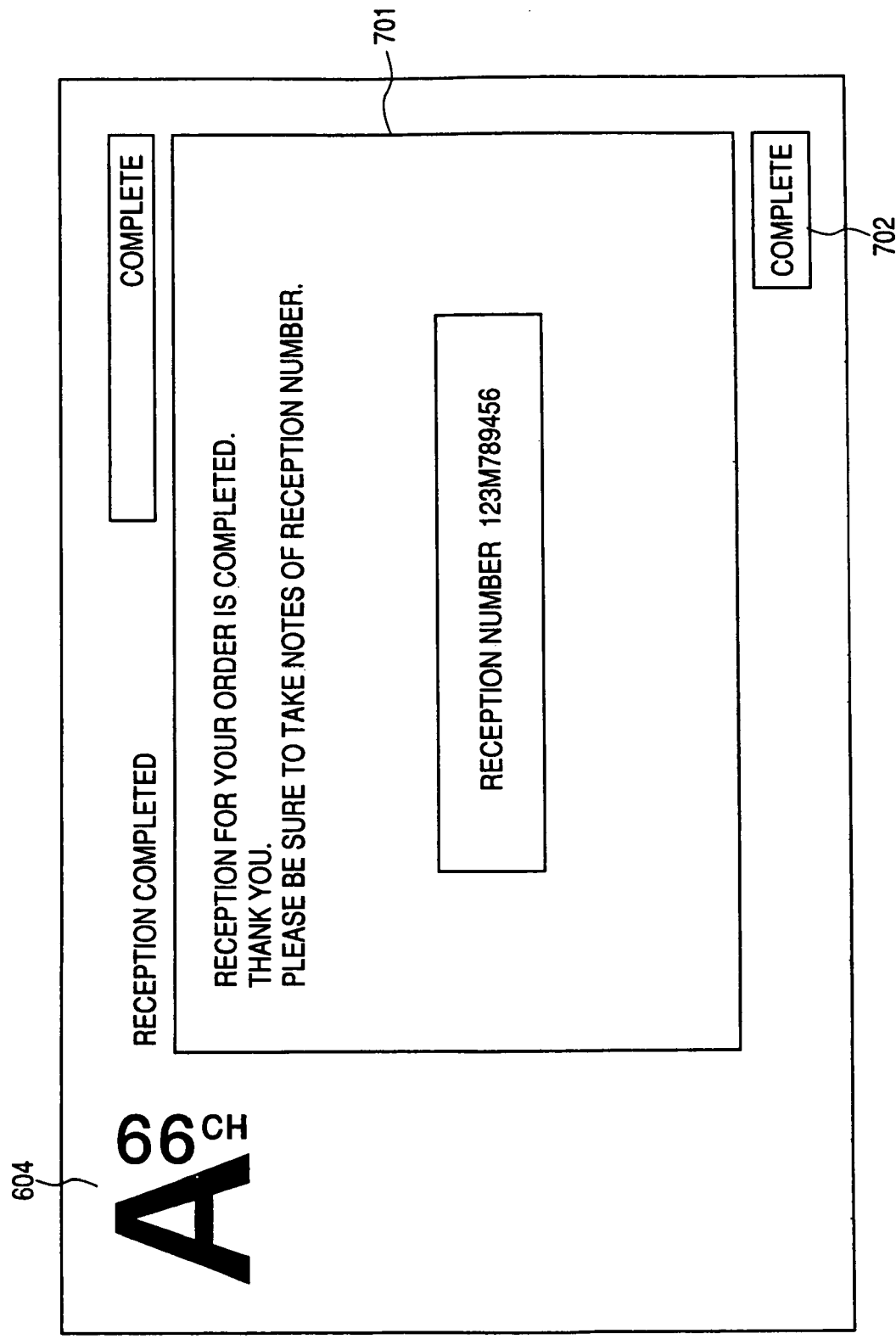
FIG. 33 is a diagram showing a transaction content indicating completion of reception.

FIG. 33 is an example of a transaction content indicating that reception of the order is completed. A message of order completion is displayed on a board 701. A "completion" button 702 is displayed on the right below the board 701. Subsequently, in step S132, when it is judged that the communication telegram is transmitted to the data center apparatus 41 by the judging unit 132, the reception channel setting unit 133 controls the receiving unit 134 to switch the reception channel from the broadcast channel of the broadcasting apparatus 31 to the original broadcast channel, that is, the broadcast channel of the broadcasting apparatus 32-1. Consequently, the broadcast channel of the broadcasting apparatus 32-1 is received by the receiving unit 134 again and a program content of the broadcast channel is displayed on the display unit 137.

When it is judged in step S123 or S129 that purchase is not instructed, the processing in steps S125 to S132 is skipped.

The transaction contents shown in FIGS. 25 to 29 and FIGS. 31 to 33 are also formed as templates and are basically used commonly in the respective channels, although slightly corrected. As a result, since it is possible to basically provide the viewer with a common interface, operability is improved. In addition, cost is reduced compared with the case in which transaction contents are prepared separately for each broadcast channel of each of the broadcasting apparatuses.

Figure 34:
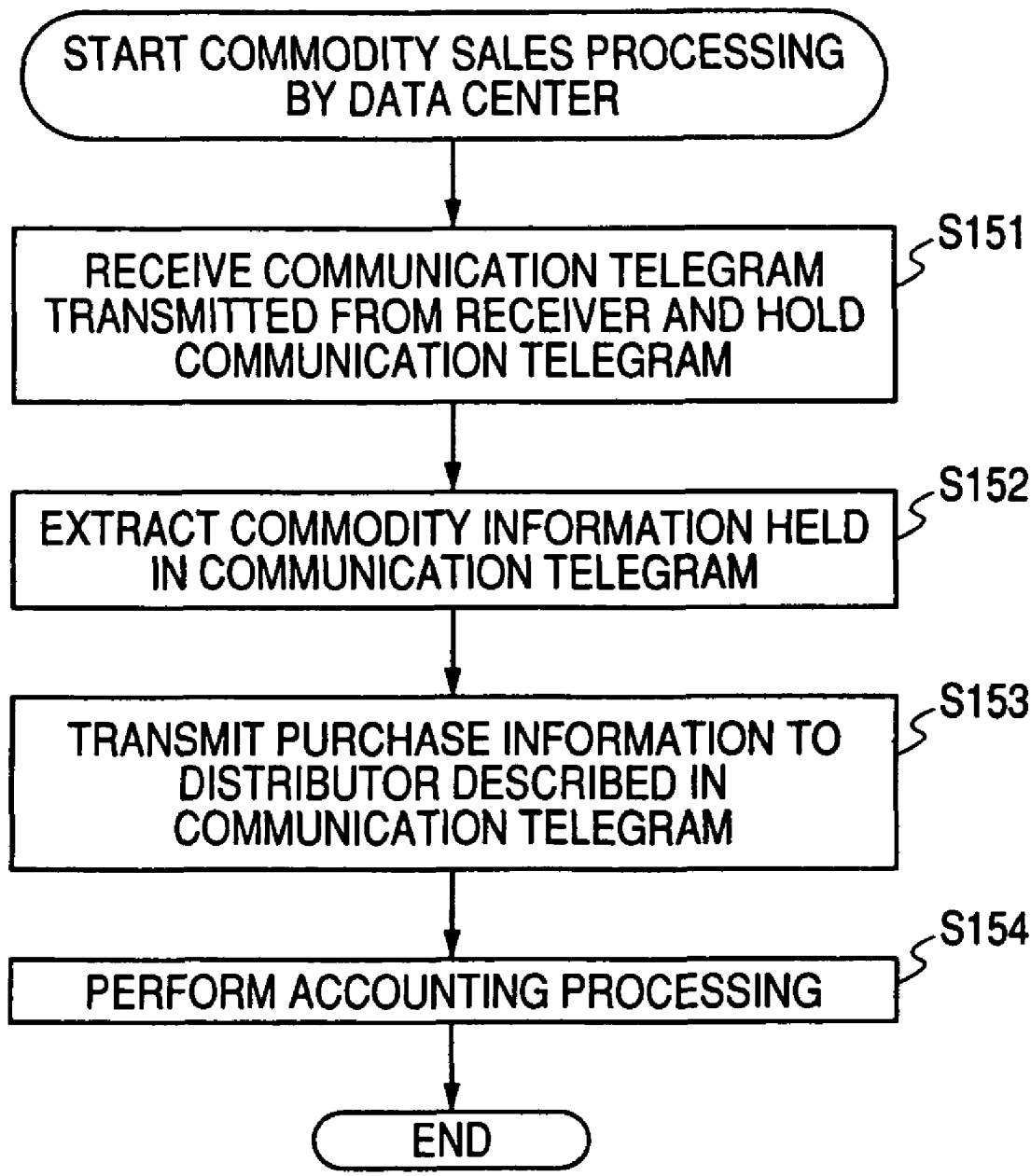
FIG. 34 is a flowchart for explaining commodity sales processing.

FIG. 34 shows processing of the data center apparatus 41 when the communication telegram for commodity purchase is transmitted from the digital television receiver 18.

In step S151, the communication unit 111 receives and holds the communication telegram transmitted from the digital television receiver 18 via the network 10. When it is necessary to perform the processing on a real time basis, in step S152, the transaction data extracting unit 112 extracts transaction data from the communication telegram extracted by the communication unit 111 and holds the transaction data. When commodity information is included in the transaction data extracted by the transaction data extracting unit 112, the analyzing unit 113 extracts the information and supplies the information to the ordering unit 114.

In step S153, the ordering unit 114 transmits purchase information to the distributor apparatus 43 of the distributor 17 described in the commodity information supplied from the analyzing unit 113. The purchase information includes the information on the purchased commodity (the name, the number, the number of items), the total amount of the commodity, the total amount including carriage, the information on the distributor, the user identification number, the delivery destination, and the information on the user.

The distributor apparatus 43 executes delivery processing for delivering the commodity to the viewer (the user) on the basis of this purchase information.

In step S154, the accounting processing unit 115 transmits information necessary for accounting (the credit card number, the total amount including carriage, etc.) to the accounting center apparatus 42 via the network 10 and requests the accounting center apparatus 42 to perform accounting processing. The accounting center apparatus 42 applies accounting processing to the viewer (the user) on the basis of this request.

When real time processing is not necessary, the processing in steps S152 to S154 is executed off-line.

In the above description, a video of a button is broadcasted as a trigger content. However, instead of broadcasting an explicit trigger content, when the data button 210 of the remote commander is operated, a command for switching to a data channel with the operation as a trigger may be broadcasted as an implicit trigger content.

A questionnaire and commodity purchase are explained above as transaction contents. However, in providing other various services to the viewer, it is possible to apply the invention. As a content receiver, other than the digital television receiver, it is possible to use, for example, a digital television tuner, a hard disk recorder, a video cassette recorder, and other information processing apparatuses. It is also possible to apply the invention to a ground-wave digital television broadcast other than the digital television broadcast using a satellite.

It is possible to cause hardware or cause software to execute the series of processing described above. In causing the software to execute the series of processing, a program constituting the software is installed in a computer built in dedicated hardware, a general purpose personal computer capable of executing various functions by installing various programs, and the like from a network or a recording medium.

As shown in FIGS. 2 to 5, this recording medium is constituted not only by removable media 66, 188, 118, and 143 consisting of a magnetic disk (including a floppy disk), an optical disk (including a CD-ROM (Compact Disk-Read Only Memory) and a DVD (Digital Versatile Disk)), a magneto-optical disk (including an MD (Mini-Disk)), a semiconductor memory, or the like having a program recorded therein, which are distributed separately from an apparatus body to provide a user with the program but also by a ROM, a hard disk, or the like having the program therein, which are provided to a user in a state in which the ROM, the hard disk, or the like is built in the apparatus body.

Note that, in this specification, a step of describing the program recorded in the recording medium includes not only processing that is performed in time series according to a described order but also processing that is executed in parallel or individually, although not always processed in time series.

In this specification, a system represents an entire apparatus constituted by plural apparatuses.

The invention claimed is:

1. A content providing system, comprising:
a receiver;
a plurality of first broadcast apparatuses respectively associated with transmission over a plurality of first broadcast channels, each one of the first broadcast apparatuses including:
a program content providing unit that provides associated program content;
a second broadcast apparatus, including:
a transaction content providing unit that provides transaction content for transmission to the receiver over a second broadcast channel, the transaction content including a plurality of templates, at least some of the plurality of templates corresponding to various transaction types, the transaction content further including a plurality of replacement information incidental to the associated program content of each one of the plurality of first broadcast channels;
each one of the first broadcast apparatuses further including:
a trigger content providing unit that provides associated trigger content that serves as a trigger for reproducing a portion of the transaction content in the receiver, the trigger content including a program to be executed in response to the associated trigger content being triggered, one or more identifiers respectively associated with at least one of one or more of the plurality of templates or one or more of the plurality of replacement information for insertion into the one or more of the plurality of templates, and
a combining unit that combines the associated program content and the associated trigger content for transmission to the receiver over its associated first broadcast channel as combined content;
wherein the receiver
(a) receives the combined content transmitted over a selected one of the plurality of first broadcast channels,
(b) when the associated trigger content is triggered by a user while the receiver is receiving the program content associated with the selected one of the plurality of first broadcast channels, (i) switches from receiving over the selected one of the plurality of first broadcast channels to receiving over the second broadcast channel in response to the triggering of the trigger content, (ii) extracts the program to be executed and the one or more identifiers from the associated trigger content, including a designated channel representing a broadcast channel to be switched to in response to the associated trigger content being triggered by the user, a switching command for causing the receiver to receive the broadcast channel designated in the designated channel, and a module ID and a questionnaire identification number identifying a transaction contents module to be extracted from plural transaction contents modules broadcast on the designated channel, (iii) performs processing using the extracted program, (iv) receives the transaction content provided by the transaction content providing unit over the second broadcast channel, (v) extracts from the received transaction content the one or more templates, and the one or more replacement information associated with the identifiers included in the associated trigger content, and (vi) causes reproduction of at least some of the transaction content based on the extracted templates and the extracted replacement information, and (c) when end of viewing of the transaction content is inputted, switches from receiving over the second broadcast channel to receiving over the selected one of the plurality of first broadcast channels and again receives the associated program content.

2. A content providing system according to claim 1, wherein the receiver transmits, over a network, information inputted by the user based on the displayed transaction content and provided to an information processing apparatus that performs processing based on the trigger content triggered by the user.

3. A content providing system according to claim 1, wherein the transaction content providing unit provides, as the portion of the transaction content, content for causing the user while viewing the displayed program content to input a response to a questionnaire.

4. A content providing system according to claim 1, wherein the transaction content providing unit provides, over the second broadcast channel, common content within the transaction content that is common to two or more of the plurality of templates.

5. A content providing method, comprising:
providing, at each one of a plurality of first broadcast apparatuses respectively associated with transmission over a plurality of first broadcast channels, program content associated with that first broadcast channel;
providing, at a second broadcast apparatus, transaction content for transmission to a receiver over a second broadcast channel, the transaction content including information incidental to the program content, the transaction content including a plurality of templates, at least some of the plurality of templates corresponding to various transaction types, the transaction content further including a plurality of replacement information incidental to the associated program content of each one of the plurality of first broadcast channels;
providing, for each one of the plurality of first broadcast apparatuses, associated trigger content that serves as a trigger for reproducing a portion of the transaction content in the receiver, the trigger content including a program to be executed in response to the associated trigger content being triggered, one or more identifiers respectively associated with at least one of one or more of the plurality of templates or one or more of the plurality of replacement information for insertion into the one or more of the plurality of templates;
combining, at each one of the plurality of first broadcast apparatuses, the associated program content and the associated trigger content;
transmitting, at each one of the plurality of first broadcast apparatuses, the associated combined content over its associated first broadcast channel;
receiving, at the receiver, the combined content transmitted over a selected one of the plurality of first broadcast channels;

when the associated trigger content is triggered by a user while the receiver is receiving the combined content transmitted over the selected one of the plurality of first broadcast channels,
the receiver (i) switching from receiving over the selected one of the plurality of first broadcast channels to receiving over the second broadcast channel in response to the triggering of the trigger content, (ii) extracting the program to be executed and the one or more identifiers from the associated trigger content, including a designated channel representing a broadcast channel to be switched to in response to the associated trigger content being triggered by the user, a switching command for causing the receiver to receive the broadcast channel designated in the designated channel, and a module ID and a questionnaire identification number identifying a transaction contents module to be extracted from plural transaction contents modules broadcast on the designated channel, (iii) performing processing using the extracted program, (iv) receiving the transaction content over the second broadcast channel, (v) extracting from the received transaction content the one or more templates and the one or more replacement information associated with the identifiers included in the associated trigger content, and (vi) causing reproduction of at least some of the transaction content based on the extracted templates and the extracted replacement information; and
when end of viewing of the transaction content is inputted in the receiver, the receiver switching from receiving over the second broadcast channel to receiving over the selected one of the plurality of first broadcast channels and again receives the associated program content.

6. A content providing method according to claim 5, wherein the receiver transmits, over a network, information inputted by the user based on the displayed transaction content and provided to an information processing apparatus that performs processing based on the trigger content triggered by the user.

7. A content providing method according to claim 5, wherein the portion of the transaction content is content for causing the user while viewing the displayed program content to input a response to a questionnaire.

8. A content providing method according to claim 5, wherein common content within the transaction content is common to two or more of the plurality of templates.

9. A content receiver, comprising:
receiving means that receives, from among a plurality of program content providing apparatuses respectively associated with transmission over a plurality of first broadcast channels each of which provides combined program content and trigger content respectively associated with that first broadcast channel, the combined program content and trigger content provided by a selected one of a plurality of program content providing apparatuses over its associated first broadcast channel or that receives transaction content provided by a transaction content providing apparatus over a second broadcast channel, the trigger content respectively associated with the selected one of the plurality of first broadcast channels serving as a trigger for reproducing the transaction content, the transaction content including a plurality of templates, at least some of the plurality of templates corresponding to various transaction types, the transaction content further including a plurality of replacement information incidental to the plurality of program content, the trigger content respectively associated with the selected one of the plurality of first broadcast channels including a program to be executed in response to the associated trigger content being triggered, one or more identifiers respectively associated with at least one of one or more of the plurality of templates or one or more of the plurality of replacement information for insertion into the one or more of the plurality of templates;

judging means that judges whether the portion of transaction content is indicated based on triggering of the trigger content respectively associated with the selected one of the plurality of first broadcast channels while the associated program content is received on the selected first broadcast channel by the receiving means; and switching control means that, (a) when the judging means judges that the trigger content respectively associated with the selected one of the plurality of first broadcast channels is triggered, causes the receiving means to (i) switch from receiving the combined content transmitted over the selected one of the plurality of first broadcast channels to receiving over the second broadcast channel in response to the triggering of the trigger content, (ii) extract the program to be executed and the one or more identifiers from the trigger content respectively associated with the selected one of the plurality of first broadcast channels, including a designated channel representing a broadcast channel to be switched to in response to the associated trigger content being triggered by the user, a switching command for causing the receiver to receive the broadcast channel designated in the designated channel, and a module ID and a questionnaire identification number identifying a transaction contents module to be extracted from plural transaction contents modules broadcast on the designated channel, (iii) perform processing using the extracted program, (iv) receive the transaction content provided by the transaction content providing apparatus over the second broadcast channel, (v) extract from the received transaction content the one or more templates and the one or more replacement information associated with the identifiers included in the trigger content respectively associated with the selected one of the plurality of first broadcast channels, and (vi) cause reproduction of at least some of the transaction content based on the extracted templates and the extracted replacement information, and (b) when end of viewing of the transaction content is inputted, causes the receiving means to switch from receiving over the second broadcast channel to again receiving the associated program content over the selected one of the plurality of first broadcast channels.

10. A content receiver according to claim 9, further comprising transmitting means that transmits, via a network, information inputted from the user based on the displayed transaction content and provided to an information processing apparatus that performs processing based on trigger content triggered by the user.

11. A content receiver according to claim 9, wherein the receiving means receives, as the portion of transaction content, content for causing the user while viewing the displayed program content to input a response to a questionnaire.

12. A content receiver according to claim 9, wherein common content within the transaction content is common to two or more of the plurality of templates.

13. A content receiving method, comprising:
a first receiving step of receiving, from among a plurality of program content providing apparatuses respectively associated with transmission over a plurality of first broadcast channels each of which provides combined program content and trigger content respectively associated with that first broadcast channel, the combined program content and trigger content provided by a selected one of a plurality of program content providing apparatuses over its associated first broadcast channel, the trigger content respectively associated with the selected one of the plurality of first broadcast channels serving as a trigger for reproducing transaction content, the transaction content including a plurality of templates, at least some of the plurality of templates corresponding to various transaction types, the transaction content further including a plurality of replacement information incidental to the plurality of program content, the trigger content respectively associated with the selected one of the plurality of first broadcast channels including a program to be executed in response to the associated trigger content being triggered, one or more identifiers respectively associated with at least one of one or more of the plurality of templates or one or more of the plurality of replacement information for insertion into the one or more of the plurality of templates;

a judging step of judging whether the portion of transaction content is indicated by a user based on triggering of the trigger content respectively associated with the selected one of the plurality of first broadcast channels while the associated program content is received on the selected first broadcast channel, the transaction content including information incidental to the program content;

when it is judged during the judging step that the transaction content is indicated,
a first switching control step of switching from receiving the combined content transmitted over the selected one of the plurality of first broadcast channels to receiving over the second broadcast channel in response to the triggering of the trigger content respectively associated with the selected one of the plurality of first broadcast channels,
a first extracting step of extracting the program to be executed and the one or more identifiers from the trigger content respectively associated with the selected one of the plurality of first broadcast channels, including a designated channel representing a broadcast channel to be switched to in response to the associated trigger content being triggered by the user, a switching command for causing the receiver to receive the broadcast channel designated in the designated channel, and a module ID and a questionnaire identification number identifying a transaction contents module to be extracted from plural transaction contents modules broadcast on the designated channel,
a processing step of performing processing using the extracted program,
a second receiving step of receiving the transaction content provided by a transaction content providing apparatus over a second broadcast channel,
a second extracting step of extracting from the received transaction content the one or more templates and the one or more replacement information associated with the identifiers included in the trigger content respectively associated with the selected one of the plurality of first broadcast channels, and
a causing step of causing reproduction of at least some of the transaction content based on the extracted templates and the extracted replacement information; and when end of viewing of the transaction content is inputted,
a second switching control step of switching from receiving over the second broadcast channel to again receiving the associated program content over the selected one of the plurality of first broadcast channels.

14. A content receiving method according to claim 13, further comprising a transmitting step of transmitting, via a network, information inputted from the user based on the displayed transaction content and provided to an information processing apparatus that performs processing based on trigger content triggered by the user.

15. A content receiving method according to claim 13, wherein the portion of transaction content is content for causing the user while viewing the program content to input a response to a questionnaire.

16. A content receiving method according to claim 13, wherein common content within the transaction content is common to two or more of the plurality of templates.

17. A non-transitory computer readable medium having recorded therein a computer program for carrying out a content receiving method, the method comprising:
a first receiving step of receiving, from among a plurality of program content providing apparatuses respectively associated with transmission over a plurality of first broadcast channels each of which provides combined program content and trigger content respectively associated with that first broadcast channel, the combined program content and trigger content provided by a selected one of a plurality of program content providing apparatuses over its associated first broadcast channel, the trigger content respectively associated with the selected one of the plurality of first broadcast channels serving as a trigger for reproducing transaction content, the transaction content including a plurality of templates, at least some of the plurality of templates corresponding to various transaction types, the transaction content further including a plurality of replacement information incidental to the plurality of program content, the trigger content respectively associated with the selected one of the plurality of first broadcast channels including a program to be executed in response to the associated trigger content being triggered, one or more identifiers respectively associated with at least one of one or more of the plurality of templates or one or more of the plurality of replacement information for insertion into the one or more of the plurality of templates;
a judging step of judging whether the portion of transaction content is indicated by a user based on triggering of the trigger content respectively associated with the selected one of the plurality of first broadcast channels while the associated program content is received on the selected first broadcast channel, the transaction content including information incidental to the program content;
when it is judged during the judging step that the transaction content is indicated,
a first switching control step of switching from receiving the combined content transmitted over the selected one of the plurality of first broadcast channels to receiving over the second broadcast channel in response to the triggering of the trigger content respectively associated with the selected one of the plurality of first broadcast channels,
a first extracting step of extracting the program to be executed and the one or more identifiers from the trigger content respectively associated with the selected one of the plurality of first broadcast channels, including a designated channel representing a broadcast channel to be switched to in response to the associated trigger content being triggered by the user, a switching command for causing the receiver to receive the broadcast channel designated in the designated channel, and a module ID and a questionnaire identification number identifying a transaction contents module to be extracted from plural transaction contents modules broadcast on the designated channel,
a processing step of performing processing using the extracted program,
a second receiving step of receiving the transaction content provided by a transaction content providing apparatus over a second broadcast channel,
a second extracting step of extracting from the received transaction content the one or more templates and the one or more replacement information associated with the identifiers included in the trigger content respectively associated with the selected one of the plurality of first broadcast channels, and
a causing step of causing reproduction of at least some of the transaction content based on the extracted templates and the extracted replacement information; and
when end of viewing of the transaction content is inputted,
a second switching control step of switching from receiving over the second broadcast channel to again receiving the associated program content over the selected one of the plurality of first broadcast channels.

18. A non-transitory computer readable medium according to claim 17, wherein the method further comprises a transmitting step of transmitting, via a network, information inputted from the user based on the displayed transaction content and provided to an information processing apparatus that performs processing based on trigger content triggered by the user.

19. A non-transitory computer readable medium according to claim 17, wherein the portion of transaction content is content for causing the user while viewing the program content to input a response to a questionnaire.

20. A non-transitory computer readable medium according to claim 17, wherein common content within the transaction content is common to two or more of the plurality of templates.

21. A processor encoded with a computer program for carrying out a content receiving method, the method comprising:
a first receiving step of receiving, from among a plurality of program content providing apparatuses respectively associated with transmission over a plurality of first broadcast channels each of which provides combined program content and trigger content respectively associated with that first broadcast channel, the combined program content and trigger content provided by a selected one of a plurality of program content providing apparatuses over its associated first broadcast channel, the trigger content respectively associated with the selected one of the plurality of first broadcast channels serving as a trigger for reproducing transaction content, the transaction content including a plurality of templates, at least some of the plurality of templates corresponding to various transaction types, the transaction content further including a plurality of replacement information incidental to the plurality of program content, the trigger content respectively associated with the selected one of the plurality of first broadcast channels including a program to be executed in response to the associated trigger content being triggered, one or more identifiers respectively associated with at least one of one or more of the plurality of templates or one or more of the plurality of replacement information for insertion into the one or more of the plurality of templates;

a judging step of judging whether the portion of transaction content is indicated by a user based on triggering of the trigger content respectively associated with the selected one of the plurality of first broadcast channels while the associated program content is received on the selected first broadcast channel, the transaction content including information incidental to the program content;

when it is judged during the judging step that the transaction content is indicated, a first switching control step of switching from receiving the combined content transmitted over the selected one of the plurality of first broadcast channels to receiving over the second broadcast channel in response to the triggering of the trigger content respectively associated with the selected one of the plurality of first broadcast channels, a first extracting step of extracting the program to be executed and the one or more identifiers from the trigger content respectively associated with the selected one of the plurality of first broadcast channels, including a designated channel representing a broadcast channel to be switched to in response to the associated trigger content being triggered by the user, a switching command for causing the receiver to receive the broadcast channel designated in the designated channel, and a module ID and a questionnaire identification number identifying a transaction contents module to be extracted from plural transaction contents modules broadcast on the designated channel, a processing step of performing processing using the extracted program, a second receiving step of receiving the transaction content provided by a transaction content providing apparatus over a second broadcast channel, a second extracting step of extracting from the received transaction content the one or more templates and the one or more replacement information associated with the identifiers included in the trigger content respectively associated with the selected one of the plurality of first broadcast channels, and a causing step of causing reproduction of at least some of the transaction content based on the extracted templates and the extracted replacement information; and when end of viewing of the transaction content is inputted, a second switching control step of switching from receiving over the second broadcast channel to again receiving the associated program content over the selected one of the plurality of first broadcast channels.

22. A processor encoded with a computer program for carrying out the content receiving method according to claim 21, wherein the method further comprises a transmitting step of transmitting, via a network, information inputted from the user based on the displayed transaction content provided to an information processing apparatus that performs processing based on trigger content triggered by the user.

23. A processor encoded with a computer program for carrying out the content receiving method according to claim 21, wherein the portion of transaction content is content for causing the user while viewing the program content to input a response to a questionnaire.

24. A processor encoded with a computer program for carrying out a content receiving method according to claim 21, wherein common content within the transaction content is common to two or more of the plurality of templates.

25. A content providing system according to claim 1, wherein the trigger content includes a switching command, and a designated channel for the second broadcast channel.

26. A content providing system according to claim 1, wherein the transaction content providing apparatus provides, as the portion of transaction content, content for causing the viewer to input information necessary for purchasing a commodity.

27. A content providing method according to claim 5, wherein the trigger content includes a switching command, and a designated channel for the second broadcast channel.

28. A content providing method according to claim 5, wherein the portion of transaction content is content for causing the viewer to input information necessary for purchasing a commodity.

29. A content receiver according to claim 9, wherein the trigger content includes a switching command, and a designated channel for the second broadcast channel.

30. A content receiver according to claim 9, wherein the portion of transaction content is content for causing the viewer to input information necessary for purchasing a commodity.

31. A content receiving method according to claim 13, wherein the trigger content includes a switching command, and a designated channel for the second broadcast channel.

32. A content receiving method according to claim 13, wherein the portion of transaction content is content for causing the viewer to input information necessary for purchasing a commodity.

33. A non-transitory computer readable medium according to claim 17, wherein the trigger content includes a switching command, and a designated channel for the second broadcast channel.

34. A non-transitory computer readable medium according to claim 17, wherein the portion of transaction content is content for causing the viewer to input information necessary for purchasing a commodity.

35. A processor encoded with a computer program for carrying out a content receiving method according to claim 21, wherein the trigger content includes a switching command, and a designated channel for the second broadcast channel.

36. A processor encoded with a computer program for carrying out a content receiving method according to claim 21, wherein the portion of transaction content is content for causing the viewer to input information necessary for purchasing a commodity.

* * * * *